US007042871B2

(12) United States Patent
Gallant et al.

(10) Patent No.: US 7,042,871 B2
(45) Date of Patent: May 9, 2006

(54) METHOD AND SYSTEM FOR SUPPRESSING EARLY MEDIA IN A COMMUNICATIONS NETWORK

(75) Inventors: John K. Gallant, Plano, TX (US); Kathleen A. McMurry, Richardson, TX (US)

(73) Assignee: MCI, LLC, Basking Ridge, NJ (US)

( * ) Notice: Subject to any disclaimer, the term of this patent is extended or adjusted under 35 U.S.C. 154(b) by 175 days.

(21) Appl. No.: 10/891,802

(22) Filed: Jul. 15, 2004

(65) Prior Publication Data

US 2005/0018659 A1 Jan. 27, 2005

Related U.S. Application Data

(60) Provisional application No. 60/489,411, filed on Jul. 23, 2003.

(51) Int. Cl.
*H04L 12/66* (2006.01)

(52) U.S. Cl. ....................... 370/352; 370/353; 370/465

(58) Field of Classification Search ............. 370/395.2, 370/352, 356, 392, 401, 432, 469, 353, 354, 370/389, 395.52, 465, 466, 467; 379/219, 379/88.13; 709/227; 455/426.1
See application file for complete search history.

(56) References Cited

U.S. PATENT DOCUMENTS 6,529,499 B1 * 3/2003 Doshi et al. ................ 370/352
6,671,262 B1 * 12/2003 Kung et al. ................. 370/260
6,683,870 B1 * 1/2004 Archer ....................... 370/356
6,735,291 B1 * 5/2004 Schmid et al. .............. 379/189
6,754,224 B1 * 6/2004 Murphy ...................... 370/432
6,771,639 B1 * 8/2004 Holden ....................... 370/352
6,791,974 B1 * 9/2004 Greenberg .................. 370/352
2003/0007469 A1 * 1/2003 Daley et al. ................ 370/335
2003/0009565 A1 * 1/2003 Arao .......................... 709/227
2003/0012170 A1 * 1/2003 Vassilovski et al. ........ 370/342
2003/0023730 A1 * 1/2003 Wengrovitz et al. ........ 709/227
2003/0169768 A1 * 9/2003 Bienn et al. ................ 370/469
2003/0224781 A1 * 12/2003 Milford et al. .......... 455/426.1
2004/0005045 A1 * 1/2004 Adams et al. .............. 370/352
2004/0086102 A1 * 5/2004 McMurry et al. ........... 379/219
2004/0120316 A1 * 6/2004 McCormack et al. ....... 370/392
2004/0165594 A1 * 8/2004 Faccin et al. ............ 370/395.2
2004/0165703 A1 * 8/2004 Jones ...................... 379/88.13

OTHER PUBLICATIONS

"Packet-Based Multimedia Communications Systems", International Telecommunication Union, ITU-T Recommendation H.323, Jul. 2003.
Falstrom, P., "E.164 Number and DNS", Internet Engineering Task Force, Request for Comments 2916, Sep. 2000.

(Continued)

*Primary Examiner*—Phirin Sam

(57) ABSTRACT

An approach is provided for supporting telephony services over a data communication network. A network server receives multiple early media streams associated with a communication session between an originating network element and one or more terminating network elements. The network server selectively suppresses the early media streams, such that the originating network element receives a single signaling message indicating status information of the communication session (or call). The present invention has particular applicability to SIP (Session Initiation Protocol) IP (Internet Protocol) telephony services.

46 Claims, 15 Drawing Sheets

OTHER PUBLICATIONS

Rosenberg et al., SIP: Session Initiation Protocol, Internet Engineering Task Force, Request for Comments 3261, Jun. 2002.

Schulzrinne et al., "RTP: A Transport Protocol for Real-Time Applications", Internet Engineering Task Force, Request for Comments 1889, Jan. 1996.

* cited by examiner

SIP CONFERENCING PLATFORM
127
VOICE MAIL SYSTEM
129
109
111
NETWORK (PROXY) SERVER
113
OSS
121
LOCATION SERVER
115
DAL GATEWAY
105
DATA NETWORK
101
ENTERPRISE GATEWAY
103
PBX
117
118
NETWORK GATEWAY
107a
107b
107
PSTN
123
125
LEGACY INTELLIGENT NETWORK
119
100

USER A
201
USER B
202
Orig.
210
Term.
214
LS
115
NS
113
220
222
224
226
228
230

202
USER B
214a
Term A
214b
Term B
214c
Term C
115
LS
NS
113
210
Orig.
201
USER A

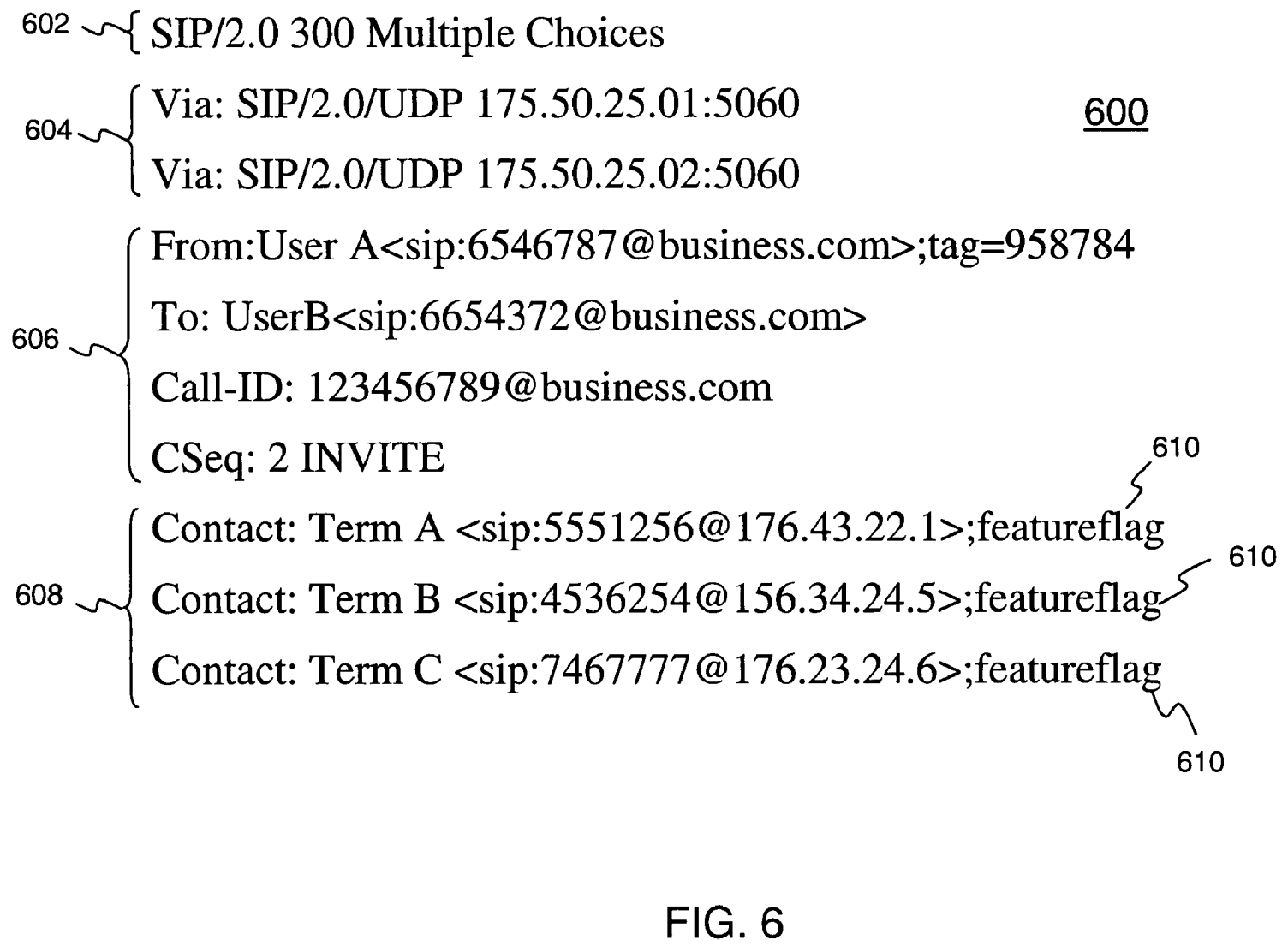

600

602 SIP/2.0 300 Multiple Choices

604
Via: SIP/2.0/UDP 175.50.25.01:5060
Via: SIP/2.0/UDP 175.50.25.02:5060

606
From:User A<sip:6546787@business.com>;tag=958784
To: UserB<sip:6654372@business.com>
Call-ID: 123456789@business.com
CSeq: 2 INVITE 608
Contact: Term A <sip:5551256@176.43.22.1>;featureflag 610
Contact: Term B <sip:4536254@156.34.24.5>;featureflag 610
Contact: Term C <sip:7467777@176.23.24.6>;featureflag 610

FIG. 6

Figure 7:
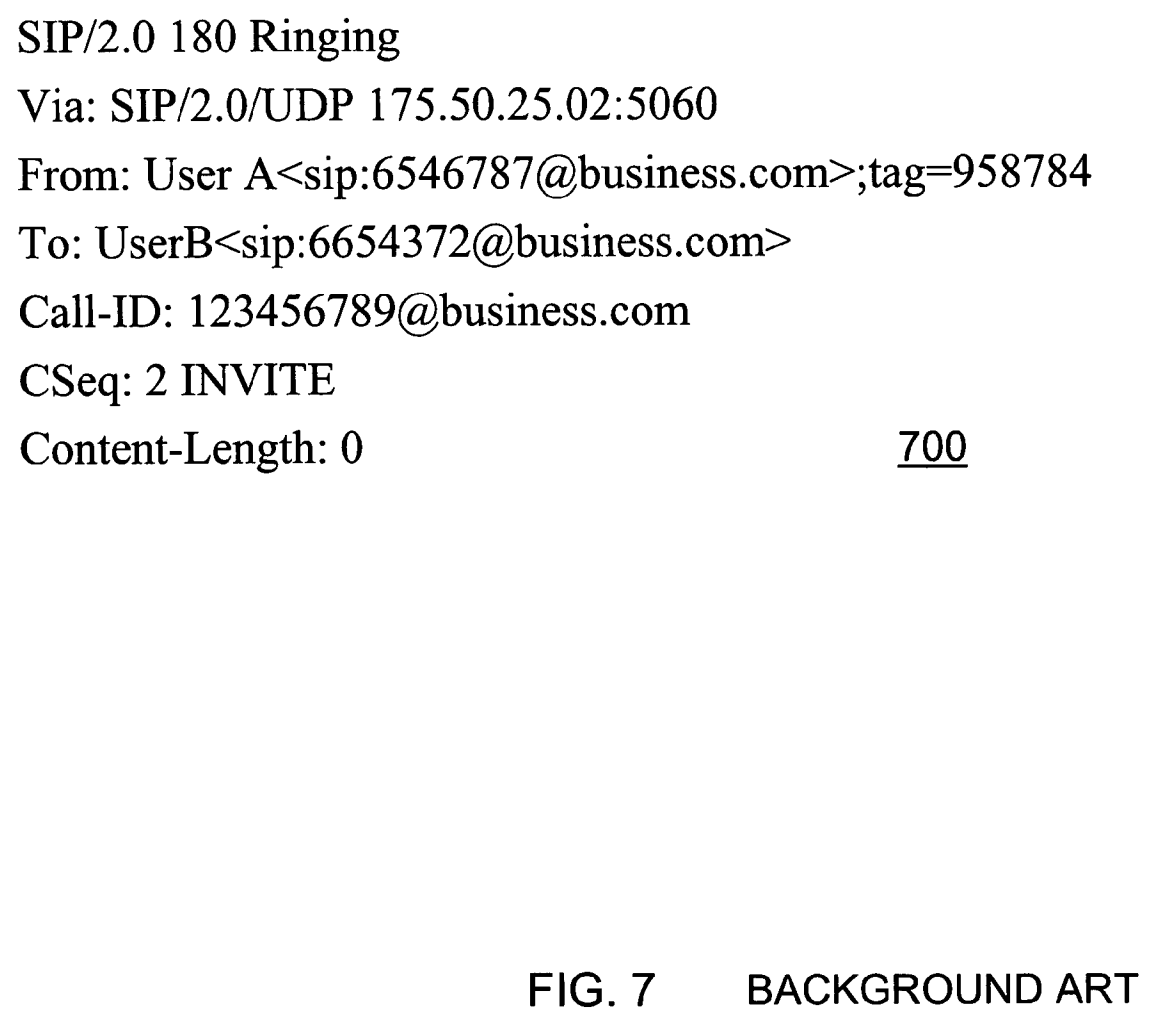

SIP/2.0 180 Ringing
Via: SIP/2.0/UDP 175.50.25.02:5060
From: User A<sip:6546787@business.com>;tag=958784
To: UserB<sip:6654372@business.com>
Call-ID: 123456789@business.com
CSeq: 2 INVITE
Content-Length: 0

Figure 8:
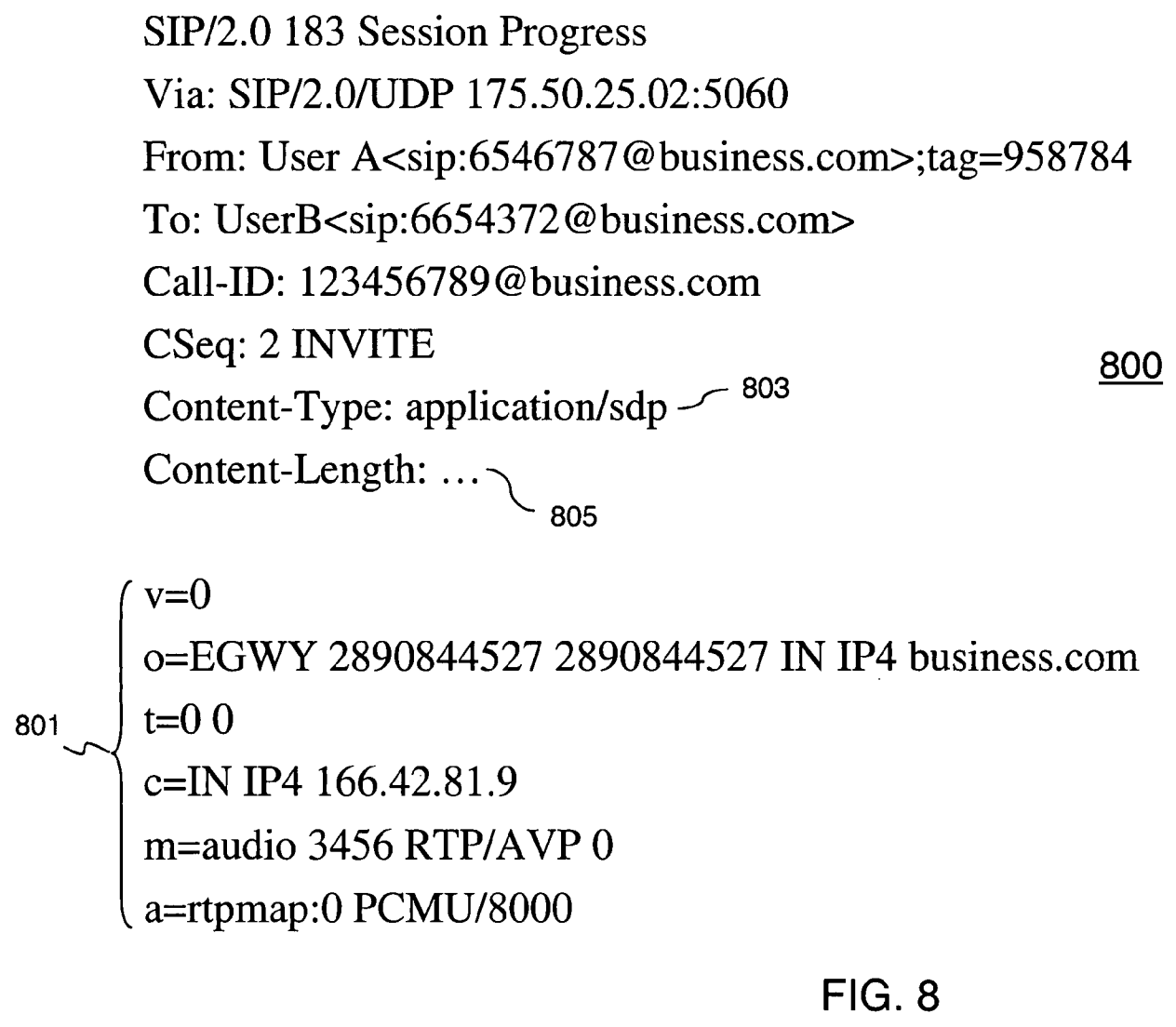

SIP/2.0 183 Session Progress
Via: SIP/2.0/UDP 175.50.25.02:5060
From: User A<sip:6546787@business.com>;tag=958784
To: UserB<sip:6654372@business.com>
Call-ID: 123456789@business.com
CSeq: 2 INVITE
Content-Type: application/sdp 803
Content-Length: … 805

801
v=0
o=EGWY 2890844527 2890844527 IN IP4 business.com
t=0 0
c=IN IP4 166.42.81.9
m=audio 3456 RTP/AVP 0
a=rtpmap:0 PCMU/8000

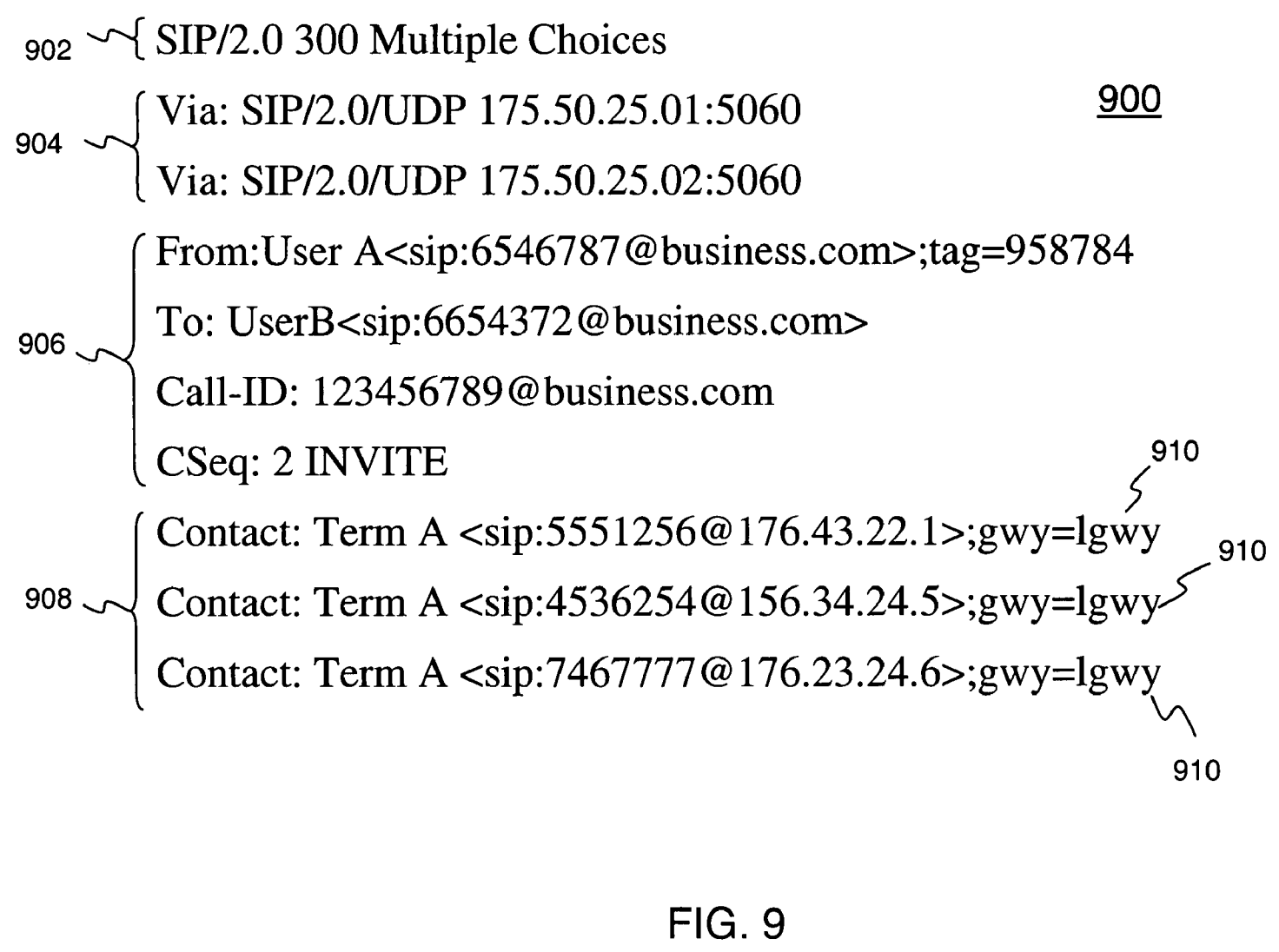

902 SIP/2.0 300 Multiple Choices

904
Via: SIP/2.0/UDP 175.50.25.01:5060
Via: SIP/2.0/UDP 175.50.25.02:5060

906
From:User A<sip:6546787@business.com>;tag=958784
To: UserB<sip:6654372@business.com>
Call-ID: 123456789@business.com
CSeq: 2 INVITE 908
Contact: Term A <sip:5551256@176.43.22.1>;gwy=lgwy 910
Contact: Term A <sip:4536254@156.34.24.5>;gwy=lgwy 910
Contact: Term A <sip:7467777@176.23.24.6>;gwy=lgwy 910

FIG. 9

START
RECEIVE “INVITE” REQUEST
1001
OBTAIN ROUTING INFORMATION FROM LOCATION SERVER
1003
RESPONSE TYPE ?
1005
“300” MESSAGE
“302” MESSAGE
RESPONSE INDICATE FEATURE INVOCATION ?
1007
YES
NO
ACTIVATE EARLY MEDIA SUPPRESSION FOR CALL
1009
PERFORM OTHER “INVITE” PROCESSING
1011
END

START
RECEIVE "INVITE" REQUEST
1101
OBTAIN ROUTING INFORMATION FROM LOCATION SERVER
1103
RESPONSE TYPE ?
1105
"300" MESSAGE
"302" MESSAGE
CONTACTS INCLUDE EARLY MEDIA SOURCES ?
1107
YES
NO
ACTIVATE EARLY MEDIA SUPPRESSION FOR CALL
1109
PERFORM OTHER "INVITE" PROCESSING
1111
END

METHOD AND SYSTEM FOR SUPPRESSING EARLY MEDIA IN A COMMUNICATIONS NETWORK

RELATED APPLICATIONS

This application is related to, and claims the benefit of the earlier filing date under 35 U.S.C. § 119(e) of, U.S. Provisional Patent Application No. 60/489,411, filed Jul. 23, 2003, entitled "Suppression of Early Media in a Communications Network"; the entirety of which is incorporated herein by reference.

FIELD OF THE INVENTION

The present invention relates to a communications system, and is more particularly related to call processing over a data network.

BACKGROUND OF THE INVENTION

The proliferation of data transport networks, most notably the Internet, has and continues to revolutionize telephony and other forms of real-time communication. Communication subscribers that have been accustomed to utilizing communication services carrying telephony traffic and data traffic over different systems are moving towards so-called "converged networks," wherein telephone voice traffic and other forms of real-time media are converted into digital form and carried by a packet data network along with other forms of data. Various types of gateways allow for sessions to be established even among diverse systems such as Internet Protocol (IP) phones, conventional analog phones and Private Branch Exchanges (PBXs) as well as with networked desktop computers. Given the maturity of communication technologies, the transmission of voice over data transport offers many advantages in terms of reduced capital and operating costs, resource efficiency and flexibility. For example, at commercial installations, both initial investments and recurring costs for customer premise equipment are substantially reduced as most of the enhanced functions, such as Private Branch Exchange (PBX) and automatic call distribution functions, may reside in a service provider's network. However, the telephony services offered by the data network must be at least as feature rich and reliable as traditional telephony systems.

Undoubtedly, as business or residential communications subscribers begin using such voice-over-packet communications to replace conventional telephony, such subscribers will demand telephony services at least as good as conventional circuit-switched telephony systems. The engineering challenge has now focused on adapting Internet Protocol (IP) networks and other packet transport networks to provide reliable toll-quality connections. In addition, easy call set-up and enhanced features for supplying full-featured telephony as well as other forms of media transport are desirable. In terms of services, for example, subscribers, particularly business subscribers, are accustomed to certain call features, such as call forwarding and conditional call handling, which can be readily implemented via PBX features or network-resident "Centrex" services.

Therefore, there is a need for an approach for effectively supporting telephony features over a data network.

SUMMARY OF THE INVENTION

These and other needs are addressed by the present invention in which an approach for selectively suppressing early media in support of telephony services over a data communication network. The establishment of a communication session (or call) between two terminals involves an exchange of parameters about the terminals and the communication session itself before the call can be established; such parameters can include hardware compatibility, protocol information, signaling information, etc. The notion of terminals encompasses end stations as well as network elements within the communication path of these end stations. In one embodiment of the present invention, a network server, in conjunction with a location server, determines whether early media suppression is to be activated for a particular communication session based on one or more criteria. Exemplary criteria include whether a feature invocation (e.g., Find-Me/Follow-Me feature) is specified, whether the call involves multiple terminating terminals (or contacts), and whether the contacts include early media sources. Furthermore, the network server can convert one type of signaling message to a different type in support of the suppression; the conversion process involves modifying and/or deleting signaling messages, as well as generating new signaling messages. The above approach advantageously provides an effective mechanism for effecting call features in a data communications environment.

In one aspect of the present invention, a method for managing call establishment in a communications system is disclosed. The method includes receiving a session progress indication associated with a call. The method also includes determining whether the session progress indication is to be suppressed during establishment of the call. Further, the method includes, responsive to whether the session progress indication is to be suppressed, suppressing the session progress indication.

In another aspect of the present invention, a method for managing a call within a communications system is disclosed. The method includes receiving a request from a first entity for a call to be established with a second entity; determining whether suppression of early media is needed for the call; and dispatching a message related to establishing the call. The method also includes receiving a response to the message comprising early media provisions; and modifying the response to remove the early media provisions. Further, the method includes sending the modified response to the first entity.

In another aspect of the present invention, a network server for supporting call establishment in a communications system is disclosed. The network server includes means for receiving a session progress indication; means for determining a call to which the session progress indication pertains; means for determining whether the session progress indication is to be suppressed during establishment of the call; and means for suppressing the session progress indication responsive to whether the session progress indication is to be suppressed.

In another aspect of the present invention, a method of supporting telephony services over a data communication network is disclosed. The method includes receiving a plurality of media streams associated with a communication session between an originating network element and a plurality of terminating network elements. Each of the media streams is received from a respective one of the terminating network elements and specifies a communication parameter of the communication session. The method also includes converting the media streams to a single signaling stream. Further, the method includes forwarding the signaling stream to the originating network element.

In yet another aspect of the present invention, a computer-readable medium carrying one or more sequences of one or more instructions for supporting telephony services over a data communication network is disclosed. The one or more sequences of one or more instructions include instructions which, when executed by one or more processors, cause the one or more processors to perform the step of receiving a plurality of media streams associated with a communication session between an originating network element and a plurality of terminating network elements. Each of the media streams is received from a respective one of the terminating network elements and specifies a communication parameter of the communication session. The method also includes converting the media streams to a single signaling stream. Further, the method includes forwarding the signaling stream to the originating network element.

In yet another aspect of the present invention, an apparatus of supporting telephony services over a data communication network is disclosed. The apparatus includes a communication interface configured to receive a plurality of media streams associated with a communication session between an originating network element and a plurality of terminating network elements. Each of the media streams is received from a respective one of the terminating network elements and specifies a communication parameter of the communication session. The apparatus also includes a processor coupled to the communication interface. The processor is configured to convert the media streams to a single signaling stream, wherein the signaling stream is forwarded to the originating network element.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6 illustrates a SIP routing response received from a location server involving multiple contacts associated with a common called party, in accordance with an embodiment of the present invention;

FIGS. 7–9 illustrate various SIP messages supported by the system of FIG. 1;

DESCRIPTION OF THE PREFERRED EMBODIMENT

A system, method, and software for supporting telephony services over a data communication network are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the present invention is discussed in the context of the Session Initiation Protocol (SIP) and an Internet Protocol (IP)-based network, one of ordinary skill in the art will recognize that the present invention may be generally applicable to other equivalent or analogous communication protocols or communications networks.

Figure 1:
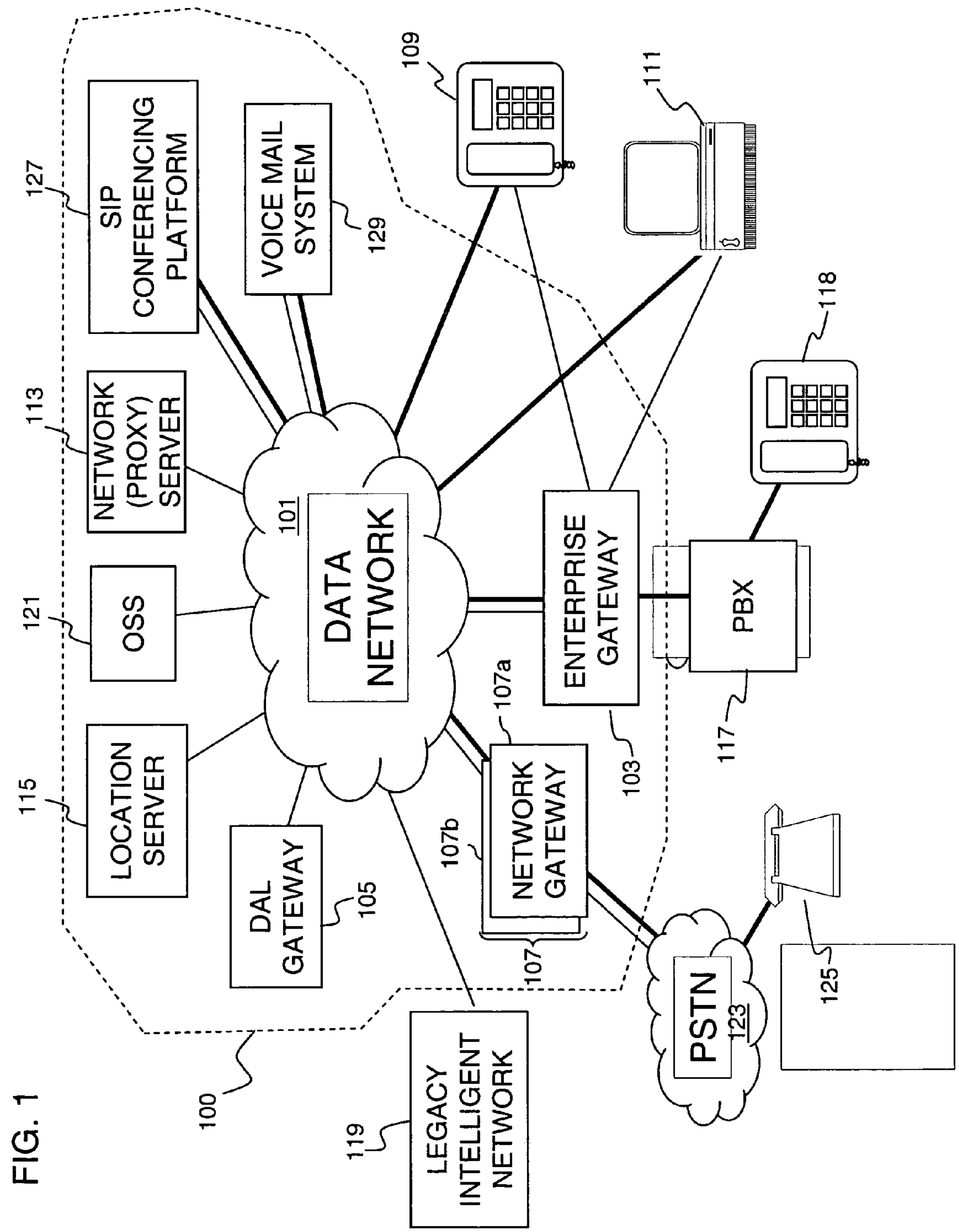
FIG. 1 is a diagram of a data communications system capable of supporting voice services, in accordance with an exemplary embodiment of the present invention.

FIG. 1 shows a diagram of a data communications system capable of supporting voice services, in accordance with an exemplary embodiment of the present invention. A communications system 100 includes a data network 101, which in an exemplary embodiment is a packet data transport (e.g., Internet Protocol (IP) based) network. The system 100 enables the establishment of communication sessions among various terminal equipment, such as telephone 125, a Private Branch Exchange (PBX) phone 118, a Session Initiation Protocol (SIP) phone 109, and a personal computer (PC) 111. In practice, there may be thousands or millions of such terminal devices served by one or more systems 100.

For the purposes of explanation, the capabilities of the system 100 are described with respect to large enterprise users. Thus, the system 100 is able to support customers that maintain multiple locations with voice and data requirements. It is noted that the features and functionalities of the system 100 are applicable to a variety of user types and communications needs.

The system 100 provides a number of elements to support voice services, including an enterprise gateway 103, a Dedicated Access Line (DAL) gateway 105, a network gateway 107, SIP conferencing platform 127, and voice mail system 129. As shown, the enterprise gateway 103 provides connectivity from a PBX 117, which contains trunks or lines often for a single business customer or location (e.g., PBX phones 118). Signaling for calls from the PBX 117 into the data network 101 comprises information which uniquely identifies the customer, trunk group, or carrier. This allows private numbers to be interpreted in their correct context. To interface to the PBX 117, the enterprise gateway 103 utilizes, for example, Integrated Digital Services Network (ISDN), Circuit Associated Signaling (CAS), or other PBX interfaces (e.g., European Telecommunications Standards Institute (ETSI) PRI, R2).

The network gateways 107 provide for an interface between the signaling and packetized transport used in the system 100 and the telephone connections (TDM) and telephony signaling used in the PSTN 123. These gateways 107*a* and 107*b* are shown in duplicate to represent the concept that any of the network gateways 107 (even the enterprise gateway 103) may be deployed as multiple units to provide redundant connectivity. A caller served by the system 100 may be able to reach PSTN 123 and the telephone 125 through alternative gateways (e.g., 107*a*, 107*b*). Even if network gateway 107*a* is busy or disabled, the network gateway 107*b* may be used to complete calls. In practice, redundant gateways can be physically or geographically separated from one another so that an outage affecting one is unlikely to affect the other. This practice of redundancy and diversity may be applied to any of the gateway facilities and server devices shown in FIG. 1. The separate network gateways 107*a* and 107*b* preferably have separate IP addresses in the address space of network 101 and are coupled to separate routers (not shown), or each to multiple routers, to further ensure robustness.

Additionally, the data network 101 can interface legacy intelligent networks 119 that provide traditional telephony services. For example, such networks 119 can include the Advanced Intelligent Network (AIN).

The Dedicated Access Line (DAL) gateway 105 is employed in system 100 to allow virtual private network (VPN) customers to be able to access their service even from a conventional telephone not served by the VPN.

Notably, the system 100 comprises the SIP elements of a proxy server 113 (also known as a network server (NS)) and a location server (LS) 115. The location server 115 serves as a repository for end user information to enable address validation, feature status, and real-time subscriber feature configuration. Additionally, the LS 115 may store configuration information.

Keeping in mind the similar nature of PC clients and standalone IP telephones, it maybe said that four possible scenarios exist with the placement of a voice over IP call: (1) phone-to-phone, (2) phone-to-PC, (3) PC-to-phone, and (4) PC-to-PC. In the first scenario of phone-to-phone call establishment, a call from the phone 125 is switched through PSTN 123 by a switch to the network gateway 107*a*, which forwards the call through the IP network 101. The packetized voice call is then routed through network 101, perhaps to another similar network gateway 107*b*, to be at another PSTN phone (not shown). Under the second scenario, the phone 125 places a call to a PC through a switch to the PSTN 123. This voice call is then switched by the PSTN 123 to the SIP network gateway 107, which forwards the voice call to the PC 111 via the network 101. The third scenario involves the PC 111 placing a call to a voice station (e.g., phone 125). Using a voice encoder, the PC 111 introduces into the network 101 a stream of voice packets that are destined for the SIP network gateway 107. The SIP network gateway 107 converts the packetized voice information into a Plain Old Telephone Service (POTS) electrical signal, which is circuit switched to the voice station (e.g., phone 125). Lastly, in the fourth scenario, the PC 111 establishes a voice call with another PC (not shown); in this case, packetized voice data is transmitted from the PC 111 via the network 101 to the other PC (not shown), where the packetized voice data is decoded.

As mentioned, the system 100 may employ SIP to exchange session setup messages. Another popular session establishment protocol is referred to as the H.323 protocol, although it is actually a set of related protocols promulgated by the International Telecommunication Union (ITU) for accomplishing multimedia communication. SIP is an alternative standard that has been developed by the Internet Engineering Task Force (IETF). SIP is a signaling protocol that is based on a client-server model, generally meaning that clients invoke required services by messaging requests to servers that can provide the services. Similar to other IETF protocols (e.g., the simple mail transfer protocol (SMTP) and Hypertext Transfer Protocol (HTTP)), SIP is a textual, humanly readable protocol.

It may be noted that neither the H.323 nor SIP protocols are limited to IP telephony applications, but have applicability to multimedia services in general. In one embodiment of the present invention, SIP is used to establish telephone calls and other types of sessions through the system 100. However, it will be apparent to those of ordinary skill in the art that the H.323 protocol (with some modifications or extensions) or other similar protocols could be utilized instead of SIP. Separate from SIP, but often used in conjunction with SIP, is the Session Description Protocol (SDP), which provides information about media streams in the multimedia sessions to permit the recipients of the session description to participate in the session.

As used herein, the term "SIP phone" refers to any client (e.g., a personal computer, a web-appliance, etc.) that is configured to provide SIP phone functionalities. The SIP phones 109 may take the form of standalone devices—e.g., a SIP phone may be designed and configured to function and appear like a Plain Old Telephone Service (POTS) telephone station. A SIP client 111, however, is a software client and may that run, for example, on a conventional personal computer (PC) or laptop computer. From a signaling perspective, these devices 109, 111 may operate quite similarly, with the main differences relating to the user interface. Unless otherwise stated, it is recognized that the functionalities of both the SIP phones 109 and the SIP client 111 are comparable and that the network operates similarly with either type of device.

The SIP phones 109 allow users to register and deregister, or login and logout, from the phone. In an exemplary embodiment, to provide mobility, SIP phones 109 permit usernames and passwords to be entered for visitors. Logging in allows the SIP phone 109 to assume the profile of the visitor. By logging in, incoming calls to the visitor's profile are directed to the phone. When a visitor logs in, the SIP phones 109 register the visitor with the network server 113 and location server 115. Any incoming call to any of the profiles registered by the phone 109 can be directed to the phone 109. The network server 113 and the location server 115 may respond similarly to both situations where a user is logged in as a visitor or where the user is logged in to their usual home device, if there is one.

With respect to E.164 and DNS addressing, the SIP phones 109 may support ENUM (Electronic Number) service, which is be used to route calls that originate in the IP domain or with ENUM-enabled networks. ENUM service is detailed in IETF RFC 2916, entitled "ENUM", which is incorporated herein by reference in its entirety. The SIP phones 109 may also support LINCP for client-based directory lookup.

A "Do Not Disturb" feature may be available at a terminal so that incoming calls are declined and, in the case of telephones and pagers for example, no ringing occurs to disturb users nearby. When "Do Not Disturb" is invoked on a SIP phone 109, the SIP phone 109 returns a Busy message if contacted by NS 113. For example, the phone 109 returns a busy signal instead of ringing when an incoming call arrives. When the SIP phone 109 returns a "486 Busy" message, the Network Server 113 and Location Server 115 can make intelligent routing decisions based on a user profile, such as whether a Call Forwarding On Busy feature has been provisioned.

It is recognized that a SIP-controlled packet transport telephony system has to support features that subscribers (or users) have enjoyed in the traditional telephone networks. For example, in the traditional telephone network, callers have been able to know when a called party line is ringing by virtue of a so-called "ringback" signal. A ringback signal sent to the caller is not to be confused with the ringing signal sent to the station of the called party. A ringback signal is an audible signal that the caller hears during the time that the called party line is ringing.

The ringback signal is useful for informing the caller that the call in fact has been successfully processed by the network 101, that the called party line is ringing and that, if the called party answers, the call will be connected. An alternative indication, such as a fast busy signal or audible prompt, might be heard if, for example, a trunk or switch is temporarily busy or out of order. Even such adverse indications are informative and preferable to having the caller simply hear silence for a prolonged period until the caller eventually gives up on the call.

In the PSTN 123, this ringback signal is typically (but not always) generated by the central office (CO) switch that is serving the called party. Because a telephone call may be routed through several switches, such as in a long distance call, to reach the called party, the central office directly serving the called party is referred to herein as the "far end" switch. In the case of a local call, both calling party and called party may be served by the same switch or central office. This switch would apply a ringing signal to the called party line, while providing audible ringback to the calling party.

For the same reasons that ringback is implemented in the PSTN 123, it is desirable to provide ringback in a SIP-controlled telephony system, such as the network 101. However, there is a significant difference between calls established in a traditional telephone network and those established using SIP and involving SIP telephony clients 109, 111. This difference relates to whether the "bearer channel" (or voice channel) is intact during call establishment.

In many conventional telephone networks, the bearer channel that will ultimately carry the conversation between a caller and called party is progressively established from one switch to the next through trunk lines as the call is routed through one or more telephony switches. At the far end switch, the one to which the called party is connected by a subscriber loop or trunk, the on-hook state of the called party line is determined. If the line shows an on-hook condition, then a ringing signal is applied to the line to cause one or more telephones coupled to the line to ring or to otherwise alert a called party to answer the incoming call. In many conventional telephone systems, at the time that the ringing signal is applied to the subscriber loop of the called party, the audio path to the calling party is intact as far as the terminating central office switch. Although it may not be the primary reason for having the voice path established as far as the terminating switch, this practice inherently enables the audible ringback generated by the far end switch to reach the caller.

If and when the called party answers the call, the far end CO recognizes the off-hook condition and ceases the ringing signal. To complete the call, the CO then merely couples the called party loop to the audio path that is already in place from the far end CO to the calling party. The parties are connected and the two-way telephone conversation may proceed.

It should be noted that methods of providing ringback in telephone networks may vary by country or by implementation. The foregoing explanation merely provides an example of the conventional approach in support of explaining the operation and advantages of the present invention. It should suffice to reiterate that it is desirable to provide for some form of ringback functionality in a SIP-controlled telephony system.

One provision for ringback in a SIP environment involves a SIP "180 Ringing" message that is sent back to a calling station, such as a SIP phone or SIP telephony client application. The caller's SIP phone or client can generate a ringing indication in response to receiving the "180 Ringing" message, thus satisfying the need for ringback to the caller in its most basic form. However, this approach lacks flexibility, as illustrated by the following examples.

For example, some modes of establishing contact with a called party can involve enterprise systems or other networks that are designed to provide audio content to the caller before the call is actually completed to its final destination. Such a scenario can involve a business enterprise having an automated answering system that helps direct the call to an appropriate destination. In this instance, use of only the SIP "180" indication would be inadequate in that there is no way for such a system to provide audible signals to the caller before the call is terminated at a final destination.

In recognition of the shortcomings of the use of SIP "180" message, an alternative mechanism can utilize a SIP "183 Session Progress" message, which can specify parameters that relate to establishing a temporary media connection between the caller (or calling party) and a remote audio-producing element handling the call. These parameters can be conveyed using the same type of Session Description Protocol (SDP) information that is commonly used for establishing the media channel through which the caller and called party would be connected. The preliminary content sent to the caller by a remote element before the called party is connected may be referred to as "early media."

One useful aspect of the SIP control paradigm is that a called party is no longer sought by reference to a particular location or telephone number. In addition to a telephone number, a called party may be identified by a name, alias or other form of "handle" similar to an email address or a chat screen name. In requesting the communications system to establish contact with someone, a caller specifies who they are trying to reach using either a telephone number or some alternative form of identifier, which, unlike a telephone number, may be entirely unrelated to any physical addressing scheme used by the communications system. Often, an arbitrary textual handle is advantageous over a telephone number for being easier for people to remember or mentally associate.

In response to a request to reach a given party, the system 100 consults stored profile information pertaining to the called party and perhaps pertaining to the calling party as well. This profile information, which in an exemplary embodiment is stored in the location server 115, indicates whether the calling party is permitted to contact the called party and what features are configured for one or both of the parties. The information obtained may also indicate, at any given instant, one or more terminal devices through which communications with the called party might be achieved. The addresses of these devices or "contacts" may include, for example, fixed Public Switched Telephone Network (PSTN) or PBX telephones 118, SIP phones 109, mobile phones, Personal Digital Assistant (PDA) devices, pagers, voicemail systems 129, etc.

As mentioned, in a SIP-controlled telephony system, a number of challenges need to be overcome. Unlike conventional telephony systems, the media data stream that ultimately connects a caller (or calling party) to a callee (or called party) is not established until the called party is found and the session parameters are mutually agreed upon between the devices or client applications used by the communicating parties. Also, because SIP and equivalent protocols are emerging technologies, traditional SIP networks do not provide full support of announcement/media servers. These announcement/media servers isolate the users from the processes of the network. In conventional SIP networks, the users may be exposed to the complexities of call establishment associated with, for example, the search for the called party without announcements being played. Furthermore, when announcements/media servers are deployed, a problem arises for SIP clients (e.g., gateways and SIP phones), in that the clients may encounter difficulty in determining which media stream (from the contacted far-end nodes) to play—as in the case of a Find-Me/Follow-Me (denoted herein as "Find-Me") service.

As seen in FIG. 1, the system 100 further includes an Operational Support Systems (OSS) 121 to provide provisioning, billing, and network management capabilities. The OSS 121 may provide an environment or an interface, such as a web-based interface, for provisioning many aspects of dialing plans, user permissions and how features operate on behalf of each user. Many of these aspects are configured via the OSS 121 by changing information within location servers 115 or databases within the system 100. Some specific features that may be configured by OSS 121 include the Find-Me/Follow-Me feature, as well as legacy Centrex features such as Unconditional Call Forwarding, Conditional Call Forwarding, Call Blocking and Call Screening.

One feature that may be configured involves the so-called Find-Me service. A Find-Me schedule provides a mechanism to route calls using a list of possible destinations, wherein each destination is tried in turn. A Find-Me list may be specified to apply during a time-of-day or day-of-week or may be associated with different categories of calling numbers. Furthermore, a default Find-Me list might be provisioned to determine general handling when the more specific Find-Me lists are not in effect. The possible destinations in a Find-Me list can be specific addresses associated with an account's profile. For instance, a specific cell-phone number or wire-line phone number can be a possible destination address. Furthermore, as a user registers his/her presence at a terminal, such as a SIP phone, the address of the terminal can be temporarily added to the Find-Me list.

The Find-Me list feature can be enabled for a user during account creation and then updated by the user. Entries made to the Find-Me list may be verified against the Feature Blocking List for the subscriber's dial plan. The user profile has a link to update the Find-Me list. Specifically, the system 100 allows the user to Create, Read, Update, and Delete an inventory of potential devices, which can be used for populating Find-Me listings.

In this Find-Me service, when a call is received attempting to reach the called party, the various contacts may be tried sequentially or simultaneously, increasing the chances that the called party will be reached no matter where they are. All of these possible contacts may be tried in response to a single request from the caller and without requiring the caller to remember and to try all of the possible locations for the called party. In many cases, it is advantageous for convenience and security reasons that the caller is insulated from knowing the specific contact information for the called party.

Multiple contacts may be used in series or in parallel to reach a called party. Furthermore, it is possible that more than one of these contacts may generate early media to be received by the calling party. Providing for early media is a useful development, but in the context of new services such as this, the use of early media can be problematic. As multiple early media streams are sent back from these multiple contacts, the normal behavior of the packet telephone unit or gateway is to simply combine the streams such that the caller will hear the sum of all the signals represented by the data streams. That is, the caller may hear several ringback signals or announcements simultaneously or in sequence, leading to confusion and an inability to comprehend or interact with any of the media content. This problem can be annoying to the caller, and significantly interferes with the usefulness of any such announcements.

However, early media is desirable in certain instances. As mentioned, one common scenario involves a call placed into a business enterprise wherein the caller is greeted by an automatic voice response system (i.e., an automatic receptionist of sorts) that may direct the call. An initial message may be played to an inbound caller before the call reaches a particular party. It is common for a caller to be greeted with an automated prompt such as "If you know your party's extension dial it now or, to access a directory, please press the star key. . . . " The caller may be required to enter an extension before the call is completed to a particular party or telephone within the business enterprise. The system 100 supports a similar interaction, whereby a caller using a data network 101 (e.g., a packet voice network) may reach the enterprise PBX 117 through the enterprise gateway 103 coupled between the packet voice network 101 and the PBX 117.

As evident from the above discussion, allowing early media to reach a caller may be appropriate in some circumstances, but detrimental in others. While the early media may be appropriate for a reaching a single location, it can be problematic or undesirable where several contacts are to be attempted for a given destination party. In accordance with an aspect of the present invention, early media is selectively suppressed in situations where multiple early media streams may be an annoyance.

A network call control function, which can be performed in conjunction by the location server 115 and the proxy server 113, provides a mechanism for determining whether a given feature has been invoked during a call set-up, and accordingly suppressing early media during the call set-up. In various embodiments of the present invention, feature invocation may be explicitly indicated or may be inferred from the presence of multiple contacts. Further, in accordance with some embodiments of the present invention, the presence of redundant alternative contacts may be discerned from multiple distinct contacts to be taken into account in determining whether to suppress early media propagation.

It should be understood throughout this disclosure that, although SIP-type messages are shown for convenience, any type of protocol or a mixture of such protocols may be applied in various parts of the overall system. In particular, the routing requests and responses between the proxy server 113 and location server 115 may strictly or loosely conform to SIP or some other standardized protocol, or may be proprietary in nature.

The SIP protocol defines numerous types of requests, which are also referred to as methods. An important method is the INVITE method, which invites a user to a conference. Another method is the BYE request, which indicates that the call may be released. In other words, BYE terminates a connection between two users or parties in a conference. Another method is the OPTIONS method. This method solicits information about capabilities without necessarily establishing a call. The REGISTER method may used to provide information to a SIP server about a user's present location. Details regarding SIP and its call control services are described in IETF RFC 3261 incorporated herein by reference in its entirety.

Transmission of SIP messages can take place in the IP network 101 through the well known User Datagram Protocol (UDP) or through the more reliable Transaction Control Protocol (TCP). Whereas SIP, H.323, or other protocols may be used to establish sessions through a data network, the actual media or "traffic" that is to be communicated among users may take place according to the well known Real-time Transport Protocol(RTP) as described in the IETF document RFC 1889, which is incorporated herein by reference.

It is likely, though not essential, that all of the call control signaling (SIP, H.323), media traffic(RTP/RTCP) and network management and provisioning will be communicated through common transport network 101. Thus, in FIG. 1, all of the elements appear in a hub arrangement around transport network 101.

In the traditional telephone network, calls are directed to specific locations or terminal devices uniquely identified by the called telephone number. In contrast, the system 100 enables the caller to specify a called party to be reached independent of any particular location or terminal. The user may move from one terminal to another and, at each terminal, may register as being present so that inbound calls are directed to the most recently registered location. Furthermore, a user may have both personal and group-wise profile settings that affect the activation of features, such as call blocking, even as a function of the time of day.

Because of the dynamic nature of user location and of call handling features, each request to establish a session is first routed to a proxy server so that user permissions may be verified, destination addresses may be found, and special features related to a user or a business may be applied to the call. Requests are serviced internally or by passing them on, possibly after translation, to other servers. A proxy (e.g., proxy server 113) interprets, and, if necessary, rewrites a request message before forwarding it.

In general, the location server 115 accepts a routing request, such as from the proxy server 113, and determines addresses or "contacts" corresponding to the destination party expressed in the routing request. In response to the request, the location server 115 may return a redirect response comprising contact information for the party. It is noted that messaging between the network server 113 and the location server 115 may use a modified version of SIP. For example, SIP acknowledges messages may be unnecessary between the network server 113 and the location server 115. Otherwise, messaging among network functions, such as the network server 113 and the location server 115, may use standard SIP or even non-SIP alternatives.

Figure 2:
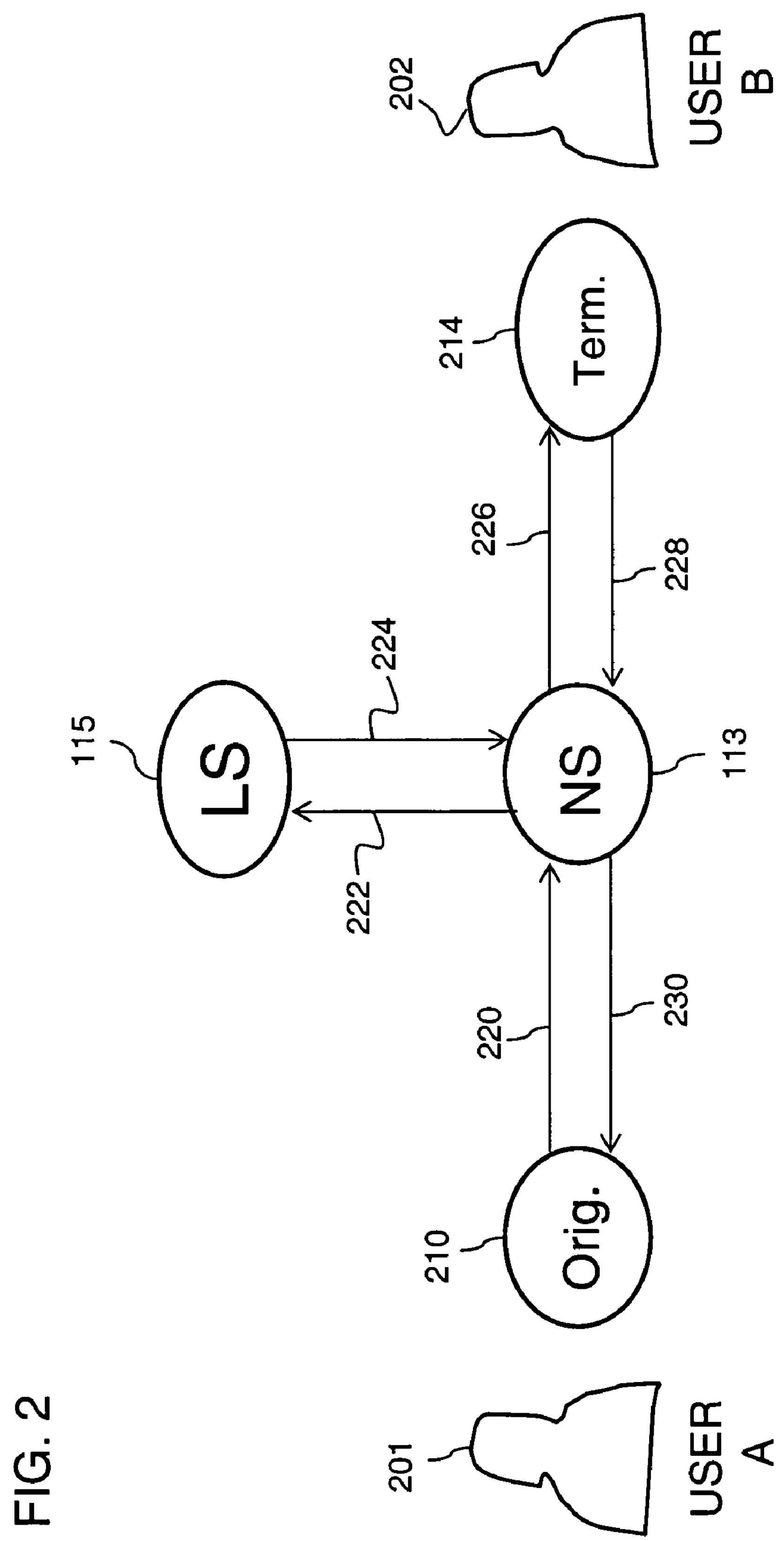
FIG. 2 is a diagram of a call establishment process according to the Session Initiation Protocol (SIP) between an originating terminal and a terminating terminal.

FIG. 2 is a diagram of a call establishment process according to the Session Initiation Protocol (SIP) between an originating terminal and a terminating terminal. In FIG. 2, a calling party 201 (labeled as "User A") initiates a call to a called party 202 (labeled as "User B"). The calling party 201 originates the call using an originating terminal 210 (e.g., a telephone or SIP telephony client). In accordance with the SIP protocol, the originating terminal 210 sends a SIP "INVITE" message 220 to network server (NS) 113. The network server 113 often performs further SIP messaging on behalf of the requesting party and may be referred to as a "proxy server." To determine how contact may be achieved with the called party 202, the NS 113 sends a routing request 222 to the location server (LS) 115. This routing request optionally takes the form of a SIP "INVITE" message similar to the message 220. The NS 113 consults the LS 115 to obtain timely location information for the called party and to have any call feature, such as call blocking, be applied based on preferences and configurations made available via the location server 115.

The LS 115 then responds to the NS 113 with a routing response 224. Routing response 224 may have various forms depending on whether the LS 115 can locate and provide contact information in response to the request 222. One form of response is a SIP "302 Temporarily Moved" message; this response will provide contact information, such as a network address, relating to how the called party may be reached.

The NS 113 examines the routing response 224 and acts upon the contact information by dispatching a SIP "INVITE" message 226 to a terminating terminal 214 (e.g., a telephone or SIP telephony client) that is specified by the contact information contained in response 224. This usually causes terminating terminal 214 to alert called party 202, such as by audibly ringing like a conventional telephone or by providing visual indication of the incoming call. It is possible that the terminating terminal 214 is already busy with a call or is set in a "do not disturb" mode and may reject the inbound call. This is unlikely, however, because the location server 115 is generally kept informed of status of the terminating terminal 214 and will prevent calls to the terminating terminal 214 while it is unavailable.

While the terminating terminal 214 commences ringing, the terminating terminal 214 sends a message back to the NS 113 indicating that ringing is occurring. This ringing message 228 can be a SIP "180 Ringing" message. Usually, the NS 113 simply forwards the ringing message 228 as ringing message 230 to be received by the originating terminal 210. The originating terminal 210 then generates an audible signal similar to the ringback tone that users are accustomed to in traditional telephony. It is noted that there is no need to establish an audio bandwidth media channel to carry a ringback signal from a distant source (e.g., terminal 214) to the originating terminal 210 because the ringback is generated locally by the originating terminal 210.

If and when User B answers the call, other messages may occur between the elements shown in FIG. 2 causing the originating terminal 210 to become coupled to the terminating terminal 214 through a voice-carrying channel, such as an RTP data stream through a packet data network.

Figure 3:
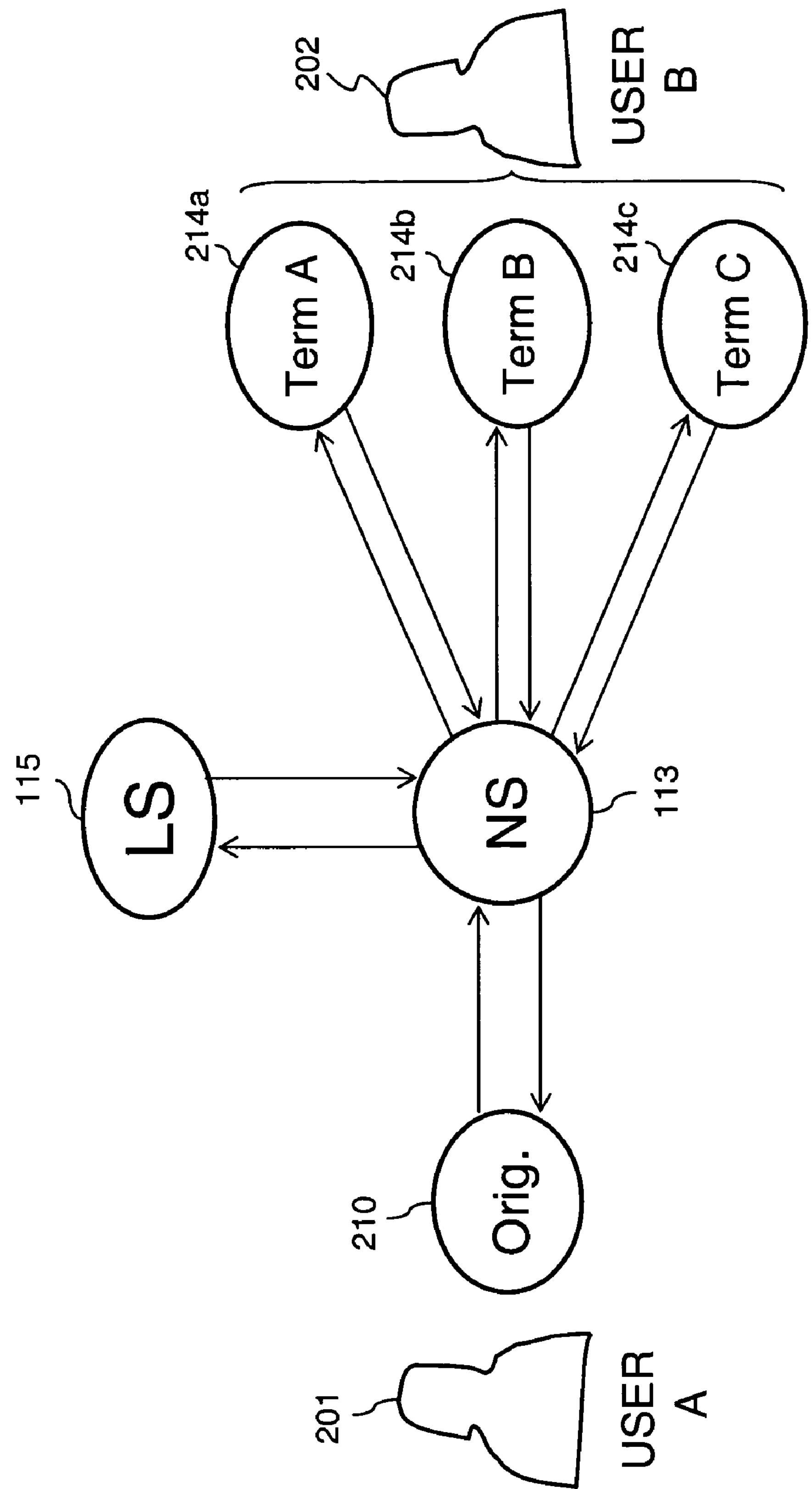
FIG. 3 is a diagram of a call establishment process according to the SIP between an originating terminal and multiple terminating terminals associated with a called party.

The single terminal scenario of FIG. 2 does not present any issues with respect to providing a unified ringing indication; however, when multiple possible destinations exist, these issues are prominent, as explained in FIG. 3.

FIG. 3 is a diagram of a call establishment process according to SIP between an originating terminal and multiple terminating terminals associated with a common called party. In this example depicts a situation wherein a called party, User B, may be at any one of several locations or may be accessible via several terminal as indicated by terminating terminals 214*a*–214*c*. User B subscribes, for instance, to the Find-Me feature, whereby inbound calls are routed to the terminating terminals 214*a* through 214*c* in a sequential fashion. Alternatively, the communications system 100 may be configured to attempt contact with all of the terminals 214*a*–214*c* simultaneously or substantially in parallel. Either sequential or parallel modes of operation may be readily implemented by provisioning of profile information accessible to location server 115 and by the action of proxying logic operating within network server 113. It is noted that where contact is attempted through multiple terminating terminals 214*a*–214*c*, each termination provides a corresponding response, such as a SIP "180 Ringing" message.

One or more of the terminating terminals 214*a*–214*c* attempted may involve passage through a gateway, such as the enterprise gateway 103 (of FIG. 1). The enterprise gateway 103 is a point of interface between a first telephone network (e.g., system 100) that is SIP controlled and or uses packet transport and a second telephony network that is a business enterprise's internal telephone system (e.g., PBX 117). The business enterprise telephony network may comprise telephones or telephone clients that are directly compatible with the packet network or may comprise telephones of proprietary design. Calls processed through the enterprise gateway 103 can reach the PBX telephone 118 provide audible signals as a form of call progress or ringback signal.

As explained, the use of multiple terminating terminals introduces the challenge of providing the originating terminal with appropriate signaling feedback about the communication session to avoid confusion.

Figure 4:
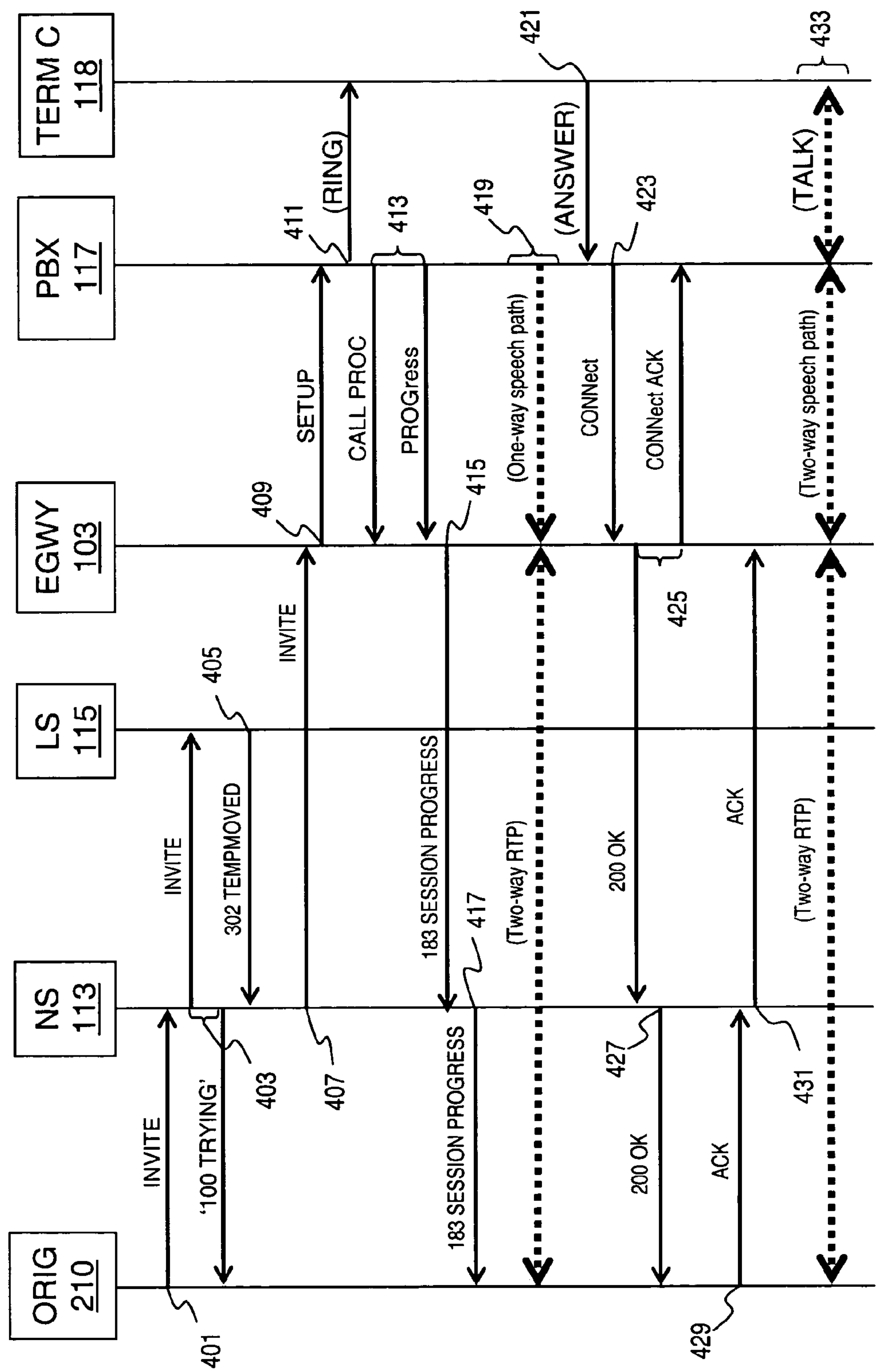
FIG. 4 is a sequence diagram of a call flow supported by the system of FIG. 1.

FIG. 4 is a sequence diagram of a call flow supported by the system of FIG. 1. To initiate a request to establish communications with another party, the originating terminal 210 sends a SIP "INVITE" message to the NS 113, per step 401. At this juncture, authentication steps can occur among the originating terminal, the NS 113, and the LS 115 before any further actions are taken by the network 101. This authentication procedure is well known, and thus, is not detailed herein. To obtain routing information, the NS 113 may send a routing request or simply forward the "INVITE" message to the LS 115 (step 403); while waiting for the LS 115 to respond, the NS 113 may send a "100 Trying" response to originating terminal 210 to indicate that call processing is at least proceeding and has not failed. In this case, the LS 115, as in step 405, responds with a SIP "302 Temporarily Moved" message which carries a single contact that should be tried for the called party. By way of example, this contact is a telephone 118, which is accessible through the enterprise gateway 103 and the PBX 117. The enterprise gateway 103, per step 407, receives a SIP "INVITE" message from the NS 113 and translates this into a signaling message suitable for the PBX 117 signaling as represented by a SETUP message to the PBX 117 (step 409). In response, the PBX 117 forwards a ring signal to the Terminal C (e.g., telephone 118), per step 411, and provides the appropriate signaling, such as CALL PROC and PROGR, and even early media (step 413).

To accommodate the possibility of early media, a SIP provisional response known as a "183 Session Progress" message may be sent, per step 415, by the gateway 103 carrying along with it additional information according to the Session Description Protocol (SDP). The "183 Session Progress" message is then conveyed by the NS 113 to the originating terminal 210, as in step 417. This additional information describes parameters of a media stream, such as codec format and sample rate for an audio stream. This information may be similar to the SDP information included with other SIP messages to eventually establish the telephony connection between originating terminal 210 and the Terminal C.

As earlier observed, it is important to support early media under certain call scenarios, such as calls being directed by automatic voice response units, which involve interactivity between the caller and the response units before actual completion or final disposition of a call from a SIP call state standpoint. In this example, the SIP "183 Session Progress" message from gateway 103 is received by the NS 113 and passed along to the originating terminal 210. The receiving of the SIP "183" message along with the SDP information typically renders the originating terminal 210 receptive to audio media coming from the PBX 117. This audio may be, for example, a greeting or prompt or customized ringing generated by the PBX 117, whereby the greeting is heard by the user at the originating terminal 210. This early media path is represented by the speech path 419 from the PBX 117 to the originating terminal 210.

If and when telephone 118 eventually is answered (step 421), additional interactions take place to connect originating terminal 210 to telephone 118. Specifically, upon receipt of an answer signal, the PBX 117 transmits, per step 423, a CONNect message to the gateway 103. In step 425, the gateway 103 acknowledges the PBX 117 with a CONNect ACK message, and sends a 200 OK message to the NS 113. In turn, the NS 113, per step 427, forwards the 200 OK message to the originating terminal 210, which acknowledges the communication session with an ACK message to the NS 113 (per step 429). The ACK message is then sent to the gateway 431. Consequently a two-way speech path 433 is established.

Figure 5:
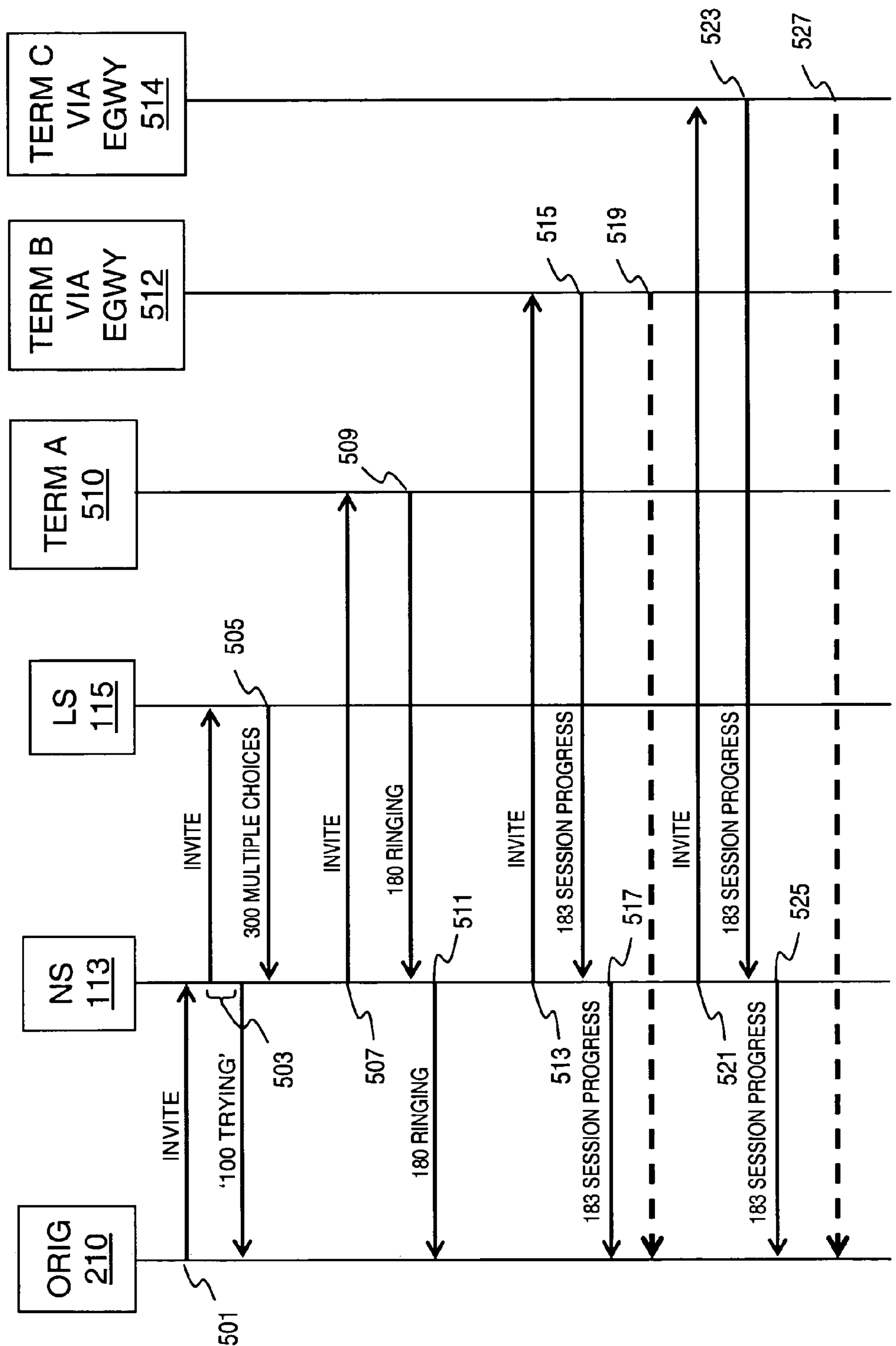
FIG. 5 is a sequence diagram of a call flow involving a call feature for locating a called party supported by the system of FIG. 1.

FIG. 5 is a sequence diagram of a call flow involving a call feature for locating a called party supported by the system of FIG. 1. This call flow illustrates how locating a called party can be problematic, particularly as enhanced features are invoked. An originating terminal 210 initiates, per step 501, a request to the NS 113, which, in turn, obtains routing information from the LS 115 by forwarding the INVITE message to the LS 115 (step 503). The LS 115 also sends a "100 Trying" message back to the originating terminal 210. In step 505, the LS 115 provides a response as a SIP "300 Multiple choices" message carrying with it several contacts that are to be attempted for the called party whom the caller is seeking.

The NS 113 then sets out to attempt communication with the contacts, sequentially or in parallel or perhaps in some other systematic manner. In FIG. 4, the NS 113 is seen to "proxy" several "INVITE" messages—one to each of the terminations 510, 512 and 514. Each termination provides a response of some type. It is noted that, for the purposes of explanation, Tern B 512 and Term C 514 summarize what is actually a connection involving the enterprise gateway 103 and the PBX 117 as was described in FIG. 4. In the case of these contacts receiving "INVITE" messages sequentially, the resulting responses would normally all be received by the originating terminal 210, including the "180 Ringing"

message from Term A 510 and the "183 Session Progress" messages from Term B 512 and Term C 514. In other scenarios, the messages might all be "180" or "183" messages or a mixture thereof and in any order or sequence.

In particular, with respect to Term A 510, upon receipt of the INVITE message sent from the NS 113 (step 507), the Term A 510 responds with a "180 Ringing" message, as in step 509. The NS 113, per step 511, forwards the "180 Ringing" message to the originating terminal 210. The "180 Ringing" from Term A 510 may cause the originating terminal 210 to provide a ringback indication to the caller. The ringback indication can be in form of an audible ringback signal.

In the case of Term B 512, the NS 113 sends the INVITE message, per step 513, and receives a "183 Session Progress" message from the Term B 512 (per step 515). In step 517, this message is forwarded to the originating terminal 210. A speech path 519 is thus established. Similarly, Term C 514 responds with a "183 Session Progress" message upon receipt of an INVITE message (per steps 523–525). Each of the "183" messages from Term B 512 and Term C 514 may be accompanied by early media streams, which are played to the caller by originating terminal 210. Hence, the caller may experience a confusing series of ringing sounds and greetings from these sources. This problem may be even worse in the case where the "INVITE" messages from the NS 113 are sent to the contacts in parallel because all of these sounds could be played simultaneously to the caller.

To address this problem, the system 100 can suppress the confusing mixture of sounds in favor of a unified ringback indication. Specifically, in an exemplary embodiment, the network server 113 can intercept the "183" messages and cause them to be withheld or to be converted into "180 Ringing" messages. The net effect would be that the caller would experience ringback in the usual fashion even though the call is actually being pursued along many different avenues (i.e., Term A, Term B, and Term C). However, it is important that the network server 113 perform such suppression of early media only under the appropriate circumstances. The following discussion describes how such determination is made by the NS 113, taking into account many factors, as explained later with respect to FIGS. 10–12.

FIG. 6 illustrates a SIP routing response received from a location server involving multiple contacts associated with a called party, in accordance with an embodiment of the present invention. In particular, the figure shows parts of a SIP "300 Multiple Choices" message. It is recognized that the location server 115 is the logical network element in which profile information pertaining to the called party is applied, including current contact information and call feature (e.g., Find-Me feature) to be applied to inbound calls. The network server 113 (or proxy) is the element that carries out the process of attempting to reach the contacts provided by the location server 115 and acting upon the responses received from these contacts. Consequently, the location server 115, preferably being stateless with respect a particular call, needs to indicate to the network server 113 that a feature invocation, such as a Find-Me list, has taken place that warrants suppression of early media.

In some implementations, the mere presence of multiple contacts may indicate that a particular feature has been applied by the location server 115. The network server 113 may infer that it should suppress early media; i.e., convert or suppress 183 messages, based upon the presence of multiple contacts in the response from the location server 115. This above discussion focuses on multiple contacts because a single contact does not involve multiple early media streams, thus suppression in this context is not needed. In fact, the early media may be necessary to support interactivity with the caller to achieve a successful call via an automated voice-response unit. Therefore, in the case of a single contact, early media suppression may be unnecessary or undesirable.

In addition to the inference drawn from the existence of multiple contacts, the network server 113 can determine whether suppression is appropriate by examining explicit flags within a routing response 600 (as shown in FIG. 6). Each SIP response includes a Start Line, encompassing Section 602. Sections 604, 606, and 608 constitute the Headers. Section 604 contains the Via fields. Section 604 provides information on the originating terminal and the terminating terminal, as well as uniquely identifying a particular invitation or all registrations of a particular client per the Call-ID (Call Identification) header field. A CSeq header field within the section 606 includes a sequence number and specifies the method; this CSeq header field identifies and orders transactions within a dialog. Section 608 enumerates the contacts involved in this transaction.

The network server 113 can suppress early media based on the setting of one or more explicit flags 610 passed with the routing response 600. According to one embodiment of the present invention, each contact shown in section 608 of message 600 includes an appended tag, shown here as "featureflag" 610. Similar to other parameters commonly encountered in messages, these flags 610 may also appear as an attribute-value pair, such as "featureflag=yes". The location server 115 may append these flags 610 (or tags) to contacts as shown or to various other parts of the message to indicate that the contact list resulted from invoking a feature or to indicate that early media suppression is otherwise appropriate as the network server 113 sets about to find the called party. Those of ordinary skill in the art will appreciate that many variations are possible in how the routing response 600 may convey to the network server 113 a need to apply early media suppression.

FIG*s*. 7–9 illustrate various Session Initiation Protocol (SIP) messages supported by the system of FIG. 1. FIG. 7 shows a SIP "180 Ringing" message, which is well known and provided here for reference and comparison. FIG. 8 depicts a SIP "183 Session Progress" message 800 comprising an SDP portion 801. Because of the presence of the SDP portion 801 a Content-Type field 803 and a Content-Length field 805, specifying values associated with the nature of the content, and length of the content, respectively. FIG. 9 shows a SIP message 900 that can be utilized by the location server 115 as a response to a routing request from a network server 113. Sections 902–906 correspond to that of the sections of the routing response 600 of FIG. 6. In this example, the contact section 908 comprise several contacts with added tags 910, indicating that the contacts pertain to connection through a gateway and represent alternative gateway addresses by which contact may be attempted. All of the contacts actually refer to a single destination point, but refer to different ways to reach the destination. This practice may be applied for robustness. The presence of multiple gateways for this purpose was early discussed in conjunction with the depiction of network gateways 107*a* and 107*b* in FIG. 1.

Although there are multiple contacts in message 900, it is not necessary to suppress early media because only one of the contacts will be successful. If a first contact is unavailable for some reason, perhaps due to congestion or failure at one gateway, then another contact will be tried involving an alternative gateway. As soon as one contact proves successful, at least from the standpoint of being able to establishing ringing at the intended destination, then none of the other contacts need be attempted. Consequently, there is no incidence of providing the caller with a confusing multiplicity of sounds. In this situation, it is inherent that no more than one early media stream will be provided to the caller.

Accordingly, in various exemplary embodiments, the location server 115 can provide some indication, for example, using the tags 910 as shown, that multiple contacts are in fact redundant contacts and that early media suppression need not be activated. The network server 113 may observe this indication in the routing response 900 and determine whether to suppress early media during call establishment.

FIGS. 10–13 are flow charts of processes for determining whether to apply early media suppression, according to an embodiment of the present invention. As noted, in accordance with an embodiment of the present invention, this process can be executed by the network server 113. In step 1001, an "INVITE" message is received by the network server 113. Next, the routing information is obtained from the location server 115, per step 1003. The network server 113 then determines the type of response, as in step 1005, whereby a "300" message entails subsequently determining whether the response specifies a feature invocation (step 1007), such as "Find-Me." If a feature invocation is present, then the network server 113 activates, as in step 1009, early media suppression for the call. Otherwise, the network server 113 performs other "INVITE" processing, per step 1011. Also, returning to the step of 1005, if the response type is "302", step 1011 is performed. The above process is applicable to early media suppression involving single or multiple contacts and whether the response indicates feature invocation that necessitates suppression. The manner in which the response reflects either or both of these conditions was described previously with respect to FIG. 6.

Figure 10:
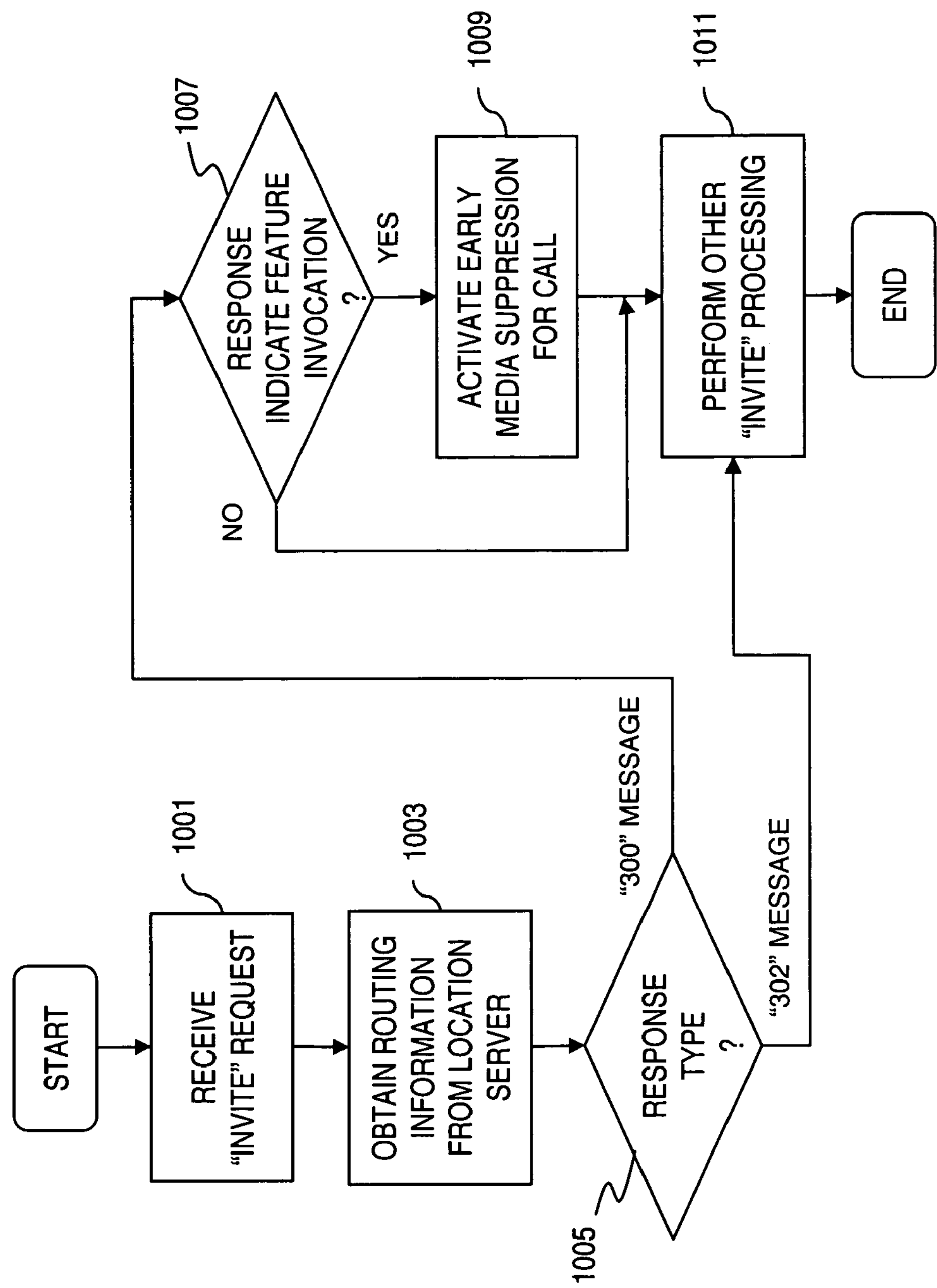
FIGS. 10–12 are flow charts of processes for determining whether to apply early media suppression, according to an embodiment of the present invention.
Figure 11:
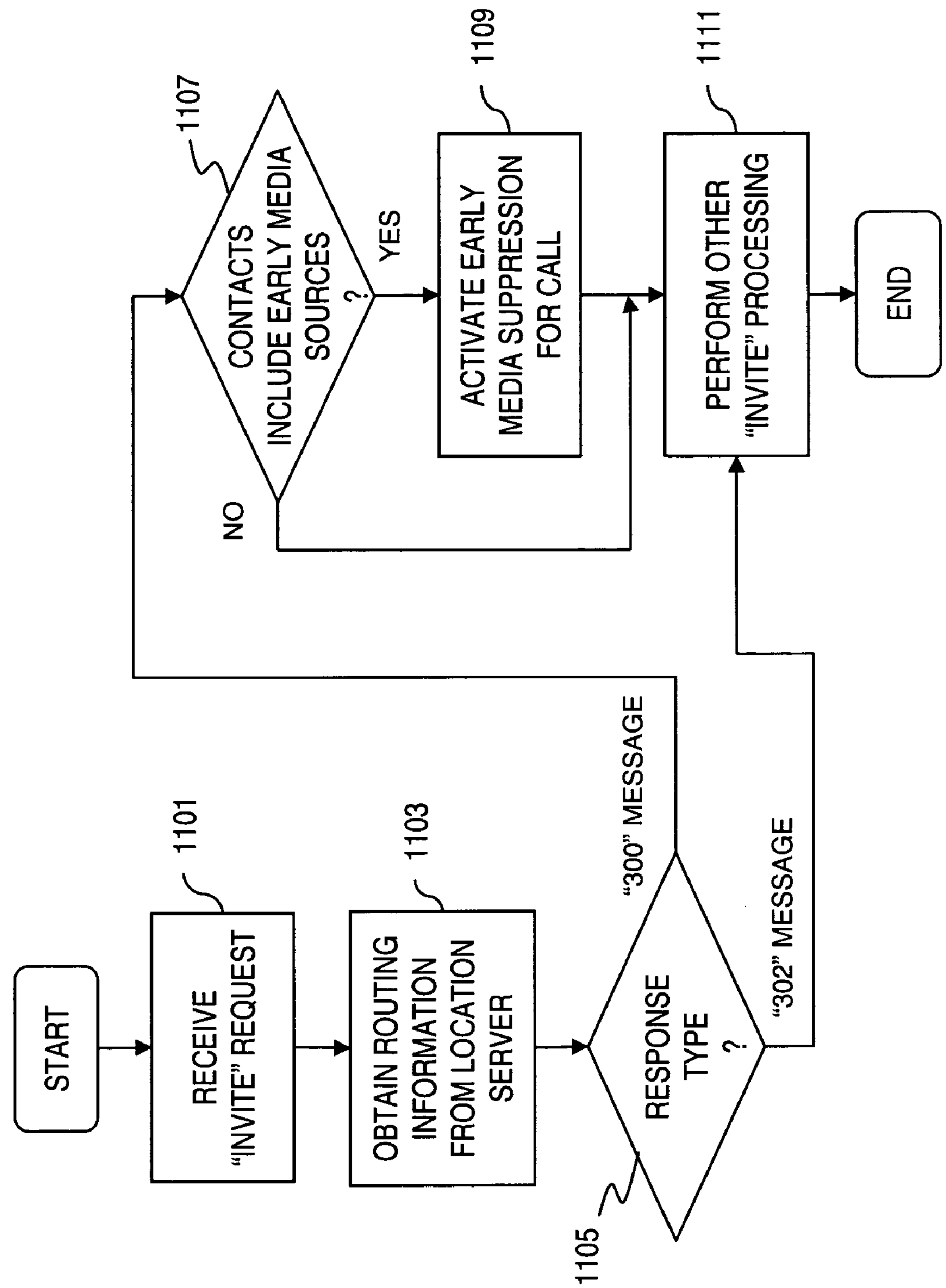

FIG. 11 shows a process for determining whether to apply early media suppression responsive to whether the response from the location server 115 includes single or multiple contacts and whether the response comprises contacts that are likely to provide early media. For example, in similar fashion to FIG. 6 or FIG. 9, a contact may be provided with a tag indicating it as being a potential source of early media, such as an enterprise gateway 103. Steps 1101–1105 of the process are similar to steps 1001–1005 of FIG. 10. However, in this process, the network server 113 determines, as in step 1107, whether the contacts include early media sources. If this determination is in the affirmative, early suppression is activated for the call (step 1109). If no contacts include early media sources, the network server 113 performs other "INVITE" processing, as in step 1111.

Figure 12:
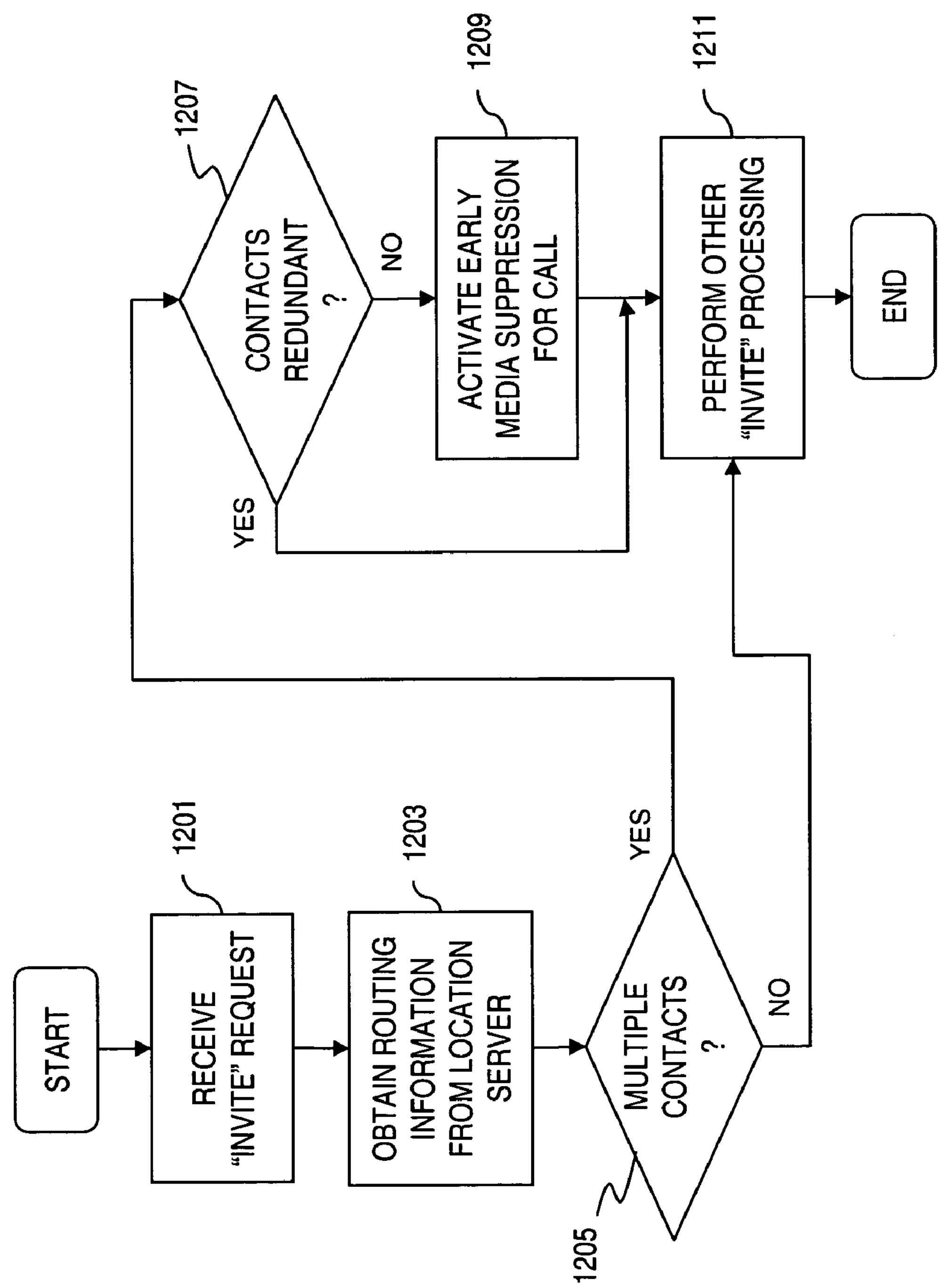

FIG. 12 shows a process for determining whether to apply early media suppression responsive to whether the response from the location server 115 includes single or multiple contacts and whether the contacts are merely multiple gateway contacts pertaining to reaching the same end destination. A manner in which this indication may be provided in a response was described above in FIG. 9. Under this process, upon receiving an "INVITE" message and subsequent acquisition of routing information from the location server 115 (per steps 1201 and 1203), the network server 113 examines the routing information to determine whether the call is associated with multiple contacts (as shown in FIG. 3). If multiple contacts are specified, then the network server 113 checks whether the contacts are redundant (i.e., lead to the same terminating terminal), per step 1207. In step 1209, the network server 113 performs early media suppression for the call if the contacts are not redundant; otherwise, other "INVITE" processing is performed (step 1211).

Those of ordinary skill in the art will recognize how the processes of FIGS. 10–12 may be combined in various ways and that the present invention is not limited to any one of these variations or combinations. For example, the NS 113 may act to suppress early media whenever there are multiple contacts or sets of contacts that do not merely refer to the same endpoint. Additionally, this determination may also be a function of whether any of the contacts are of a type that may send early media.

Figure 13:
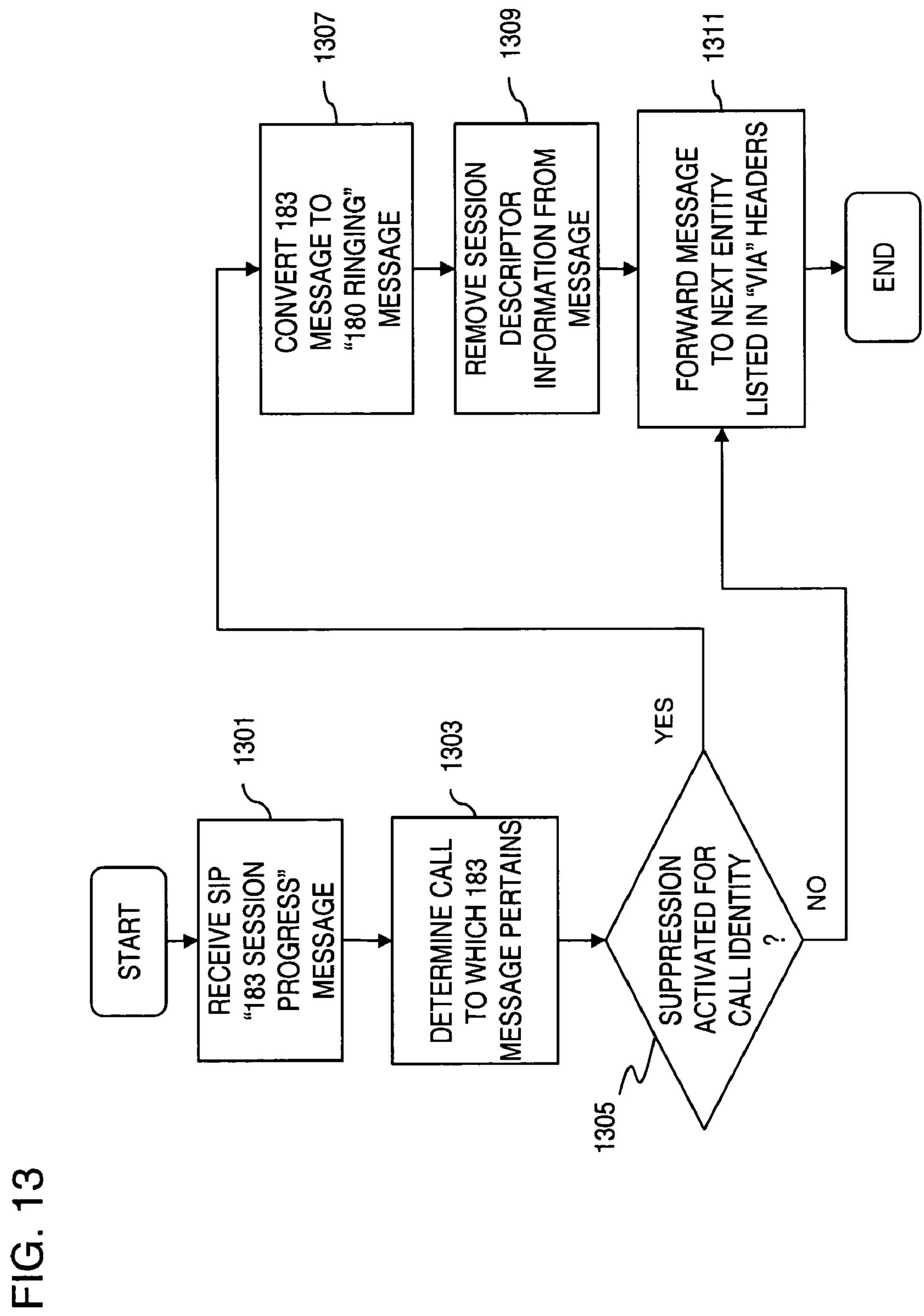
FIG. 13 is a flow chart of a process for modifying a call signaling message, according to an embodiment of the present invention.

FIG. 13 shows a process for modifying a call signaling message, according to an embodiment of the present invention. In step 1301, a SIP "183 Session Progress" message is received. Next, the message is then matched up with the call (or communication session) having a unique call identity, per step 1303. That is, the process identifies the call to which the response pertains. The response message comprises particular values for the To, From and Call-ID headers for uniquely identifying the call (as shown in FIGS. 6–9). These fields contain the same values present in the INVITE message that was used to initiate the call.

In step 1305, it is determined whether early media suppression is activated for the particular call based on the call identity. If early media suppression is activated, then the "183 Session Progress" message is converted to a "180 Ringing" message, per step 1307. Next, the SDP portion of the message is removed, as in step 1309; this is equivalent to converting the message of FIG. 8 to that of FIG. 7. It is noted that this conversion involves changing the message type, removing the SDP portion and changing Content-Type and Content-Length. In step 1311, the "180 Ringing" message is forwarded to the next entity specified in the Via header field.

Figure 14:
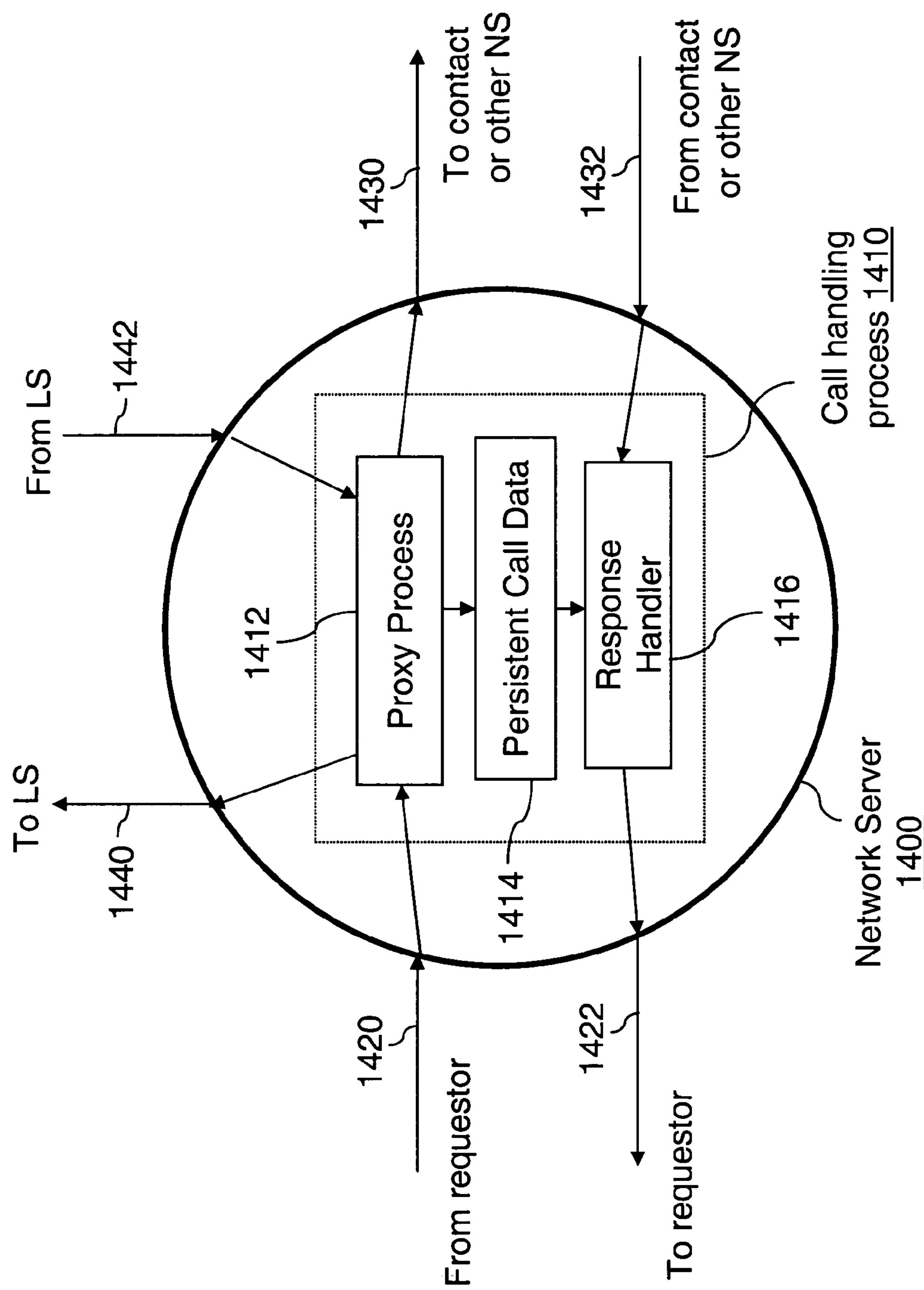
FIG. 14 is a diagram of an exemplary network server used in the system of FIG. 1.

FIG. 14 is a diagram of an exemplary network server used in the system of FIG. 1. As shown, within a Network Server (NS) 1400, a call handling process 1410 may be instantiated whenever a new call request is received, such as a request 1420. The call handling process 1410 may also be a process that is already operating prior to the receipt of a particular request that is generally available to process incoming requests. The call handling process 1410 performs all receiving, processing and sending of messages pertaining to a call as identified by an initial incoming INVITE request.

The call handling process 1410, in an exemplary embodiment, comprises a proxy process 1412 that conducts the routing request/response communications with the location server 115 and carries out the dispatching of further messages as necessary to carry out requested services, including features, such as "Find-Me," involving sequencing through contact attempts.

In the course of handling an initial request from a requester and routing instructions from the location server 115, the proxy process 1412 can set aside persistent information pertaining to the call context in a persistent call data store 1414. One aspect with having data stored in the data store 1414 includes providing indication of whether early media suppression is activated for the call. The proxy process 1412 may implement processes, such as those described in FIGS. 10–12 herein or a combination thereof, to determine whether early media suppression is to be applied as the call is being established. The outcome of this determination may be stored for reference as responses are received from contacts.

The call handling process 1410 also includes a response handler 1416 for recognizing and acting upon response messages received by the NS 1400 from contacts or other the NS elements (not shown). By way of example, the response handler 1416 can execute a process similar to FIG. 13 by receiving each response message, matching the response to an existing call currently being handled by the NS 1400, and acting upon the response message.

The response handler 1416 can simply forward the response "upstream" along path 1422. Alternatively, and in according with the present inventive teachings, the response handler 1416 can convert a received SIP "183" message containing early media information into a SIP "180" message. The response handler 1416 selectively performs such conversion responsive to data within the persistent call data store 1414.

The proxy process 1412 can determine that early media suppression is appropriate for the call and store this information in the persistent data store 1414, effectively activating early media suppression for the call. Subsequently, when a response is received from a contact pertaining to the call, the response handler 1416 is able to retrieve this stored indication, and either to convert the response message or to forward the response unmodified as appropriate.

Messages to and from a requester, depicted by arrows 1422 and 1432, may be exchanged with a user client, such as a SIP telephone, or with another network server or even another call handling process instance within the same network server. Messages depicted by arrows 1430 and 1432 may be exchanged with a called party client, a gateway device, another network server or even another call handling process instance within the same network server. Messages to and from a location server 115 are depicted by arrows 1440 and 1442.

Those of ordinary skill will recognize that variations are possible in how processing of responses and suppression of early media may be performed. For example, it may be possible to make the determination of whether to suppress early media at the time that a response message is received from a contact rather than when a routing response is originally obtained from a location server. However, this approach may be less efficient under certain circumstances.

Furthermore, in a practical implementation, all types of messages may be received by a network server through a common port and must be interpreted and subjected to the appropriate processing.

Figure 15:
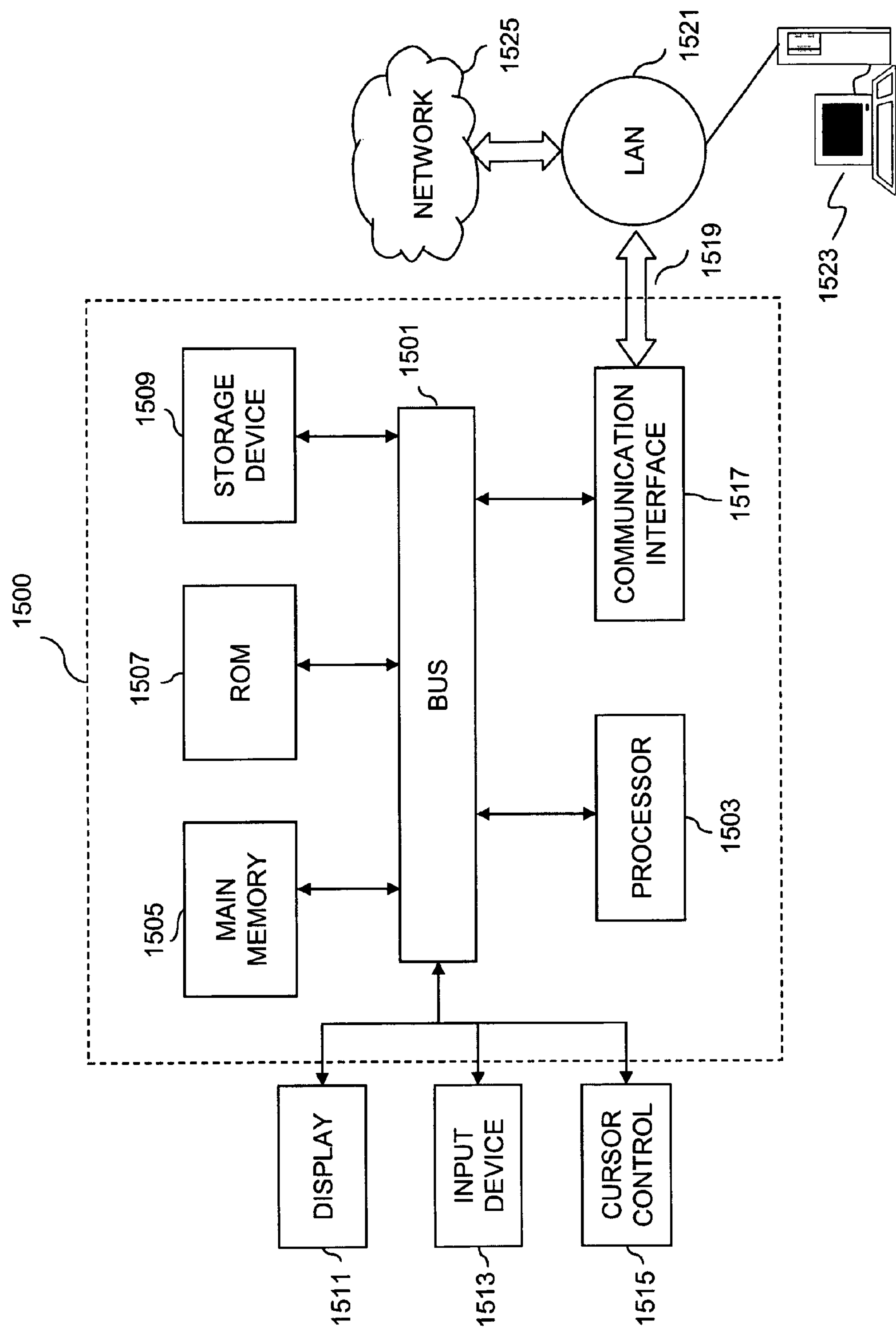
FIG. 15 is a diagram of a computer system that can be used to implement an embodiment of the present invention.

FIG. 15 illustrates a computer system 1500 within which an embodiment according to the present invention can be implemented. The computer system 1500 includes a bus 1501 or other communication mechanism for communicating information, and a processor 1503 coupled to the bus 1501 for processing information. The computer system 1500 also includes main memory 1505, such as a random access memory (RAM) or other dynamic storage device, coupled to the bus 1501 for storing information and instructions to be executed by the processor 1503. Main memory 1505 can also be used for storing temporary variables or other intermediate information during execution of instructions to be executed by the processor 1503. The computer system 1500 further includes a read only memory (ROM) 1507 or other static storage device coupled to the bus 1501 for storing static information and instructions for the processor 1503. A storage device 1509, such as a magnetic disk or optical disk, is additionally coupled to the bus 1501 for storing information and instructions.

The computer system 1500 may be coupled via the bus 1501 to a display 1511, such as a cathode ray tube (CRT), liquid crystal display, active matrix display, or plasma display, for displaying information to a computer user. An input device 1513, such as a keyboard including alphanumeric and other keys, is coupled to the bus 1501 for communicating information and command selections to the processor 1503. Another type of user input device is cursor control 1515, such as a mouse, a trackball, or cursor direction keys for communicating direction information and command selections to the processor 1503 and for controlling cursor movement on the display 1511.

According to one embodiment of the invention, the SIP server functionalities are provided by the computer system 1500 in response to the processor 1503 executing an arrangement of instructions contained in main memory 1505. Such instructions can be read into main memory 1505 from another computer-readable medium, such as the storage device 1509. Execution of the arrangement of instructions contained in main memory 1505 causes the processor 1503 to perform the process steps described herein. One or more processors in a multi-processing arrangement may also be employed to execute the instructions contained in main memory 1505. In alternative embodiments, hard-wired circuitry may be used in place of or in combination with software instructions to implement the embodiment of the present invention. Thus, embodiments of the present invention are not limited to any specific combination of hardware circuitry and software.

The computer system 1500 also includes a communication interface 1517 coupled to bus 1501. The communication interface 1517 provides a two-way data communication coupling to a network link 1519 connected to a local network 1521. For example, the communication interface 1517 may be a digital subscriber line (DSL) card or modem, an integrated services digital network (ISDN) card, a cable modem, or a telephone modem to provide a data communication connection to a corresponding type of telephone line. As another example, communication interface 1517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1517 sends and receives electrical, electromagnetic, or optical signals that carry digital data streams representing various types of information. Further, the communication interface 1517 can include peripheral interface devices, such as a Universal Serial Bus (USB) interface, a PCMCIA (Personal Computer Memory Card International Association) interface, etc. Although only a single communication interface 1517 is shown, it is recognized that multiple communication interfaces may be employed to communicate with different networks and devices.

The network link 1519 typically provides data communication through one or more networks to other data devices. For example, the network link 1519 may provide a connection through local network 1521 to a host computer 1523, which has connectivity to a network 1525 (e.g. a wide area network (WAN) or the global packet data communication network now commonly referred to as the "Internet") or to data equipment operated by service provider. The local network 1521 and network 1525 both use electrical, electromagnetic, or optical signals to convey information and instructions. The signals through the various networks and the signals on network link 1519 and through communication interface 1517, which communicate digital data with computer system 1500, are exemplary forms of carrier waves bearing the information and instructions.

The computer system 1500 can send messages and receive data, including program code, through the networks, network link 1519, and communication interface 1517. In the Internet example, a server (not shown) might transmit requested code associated with an application program for implementing an embodiment of the present invention through the network 1525, local network 1521 and communication interface 1517. The processor 1504 may execute the transmitted code while being received and/or store the code in storage device 1509, or other non-volatile storage for later execution. In this manner, computer system 1500 may obtain application code in the form of a carrier wave.

The term "computer-readable medium" as used herein refers to any medium that participates in providing instructions to the processor 1503 for execution. Such a medium may take many forms, including but not limited to non-volatile media, volatile media, and transmission media. Non-volatile media include, for example, optical or magnetic disks, such as storage device 1509. Volatile media include dynamic memory, such as main memory 1505. Transmission media include coaxial cables, copper wire and fiber optics, including the wires that comprise bus 1501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

While the present invention has been described in connection with a number of embodiments and implementations, the present invention is not so limited but covers various obvious modifications and equivalent arrangements, which fall within the purview of the appended claims.

What is claimed is:

1. A method for managing call establishment in a communications system, the method comprising:

receiving a session progress indication associated with a call;

determining whether the session progress indication is to be suppressed during establishment of the call; and responsive to whether the session progress indication is to be suppressed, suppressing the session progress indication.

2. A method according to claim 1, wherein the session progress indication comprises session description information, the method further comprising:

removing the session description information from the session progress indication.

3. A method according to claim 1, further comprising:

converting the session progress indication to an alternative type of indication.

4. A method according to claim 3, wherein the alternative type of indication is a ringing indication.

5. A method according to claim 3, wherein the alternative type of indication causes a ringback indication, instead of early media playback, to occur at a station originating the call.

6. A method according to claim 3, wherein the session progress indication is a Session Initiation Protocol (SIP) "183" message, and the alternative type of indication is a SIP "180" message.

7. A method according to claim 3, further comprising:

providing the alternative type of indication to at least one of a station originating the call and an element involved in establishment of the call.

8. A method according to claim 1, further comprising:

selectively providing the session progress indication to at least one of a station originating the call and a call processing element involved in establishing the call.

9. A method according to claim 1, further comprising:

from a location server, obtaining contact information pertaining to the call; and determining whether the session progress indication is to be suppressed during the establishment of the call responsive to the contact information from the location server.

10. A method according to claim 9, further comprising:

determining from the contact information whether the call establishment involves feature invocation, wherein the suppression of the session progress indication is based on the determination that the call establishment involves feature invocation.

11. A method according to claim 10, wherein the contact information comprises an indicator of whether the call establishment involves the feature invocation.

12. A method according to claim 9, further comprising:

determining from the contact information whether multiple contacts are to be attempted in establishing the call, wherein the suppression of the session progress indication is based on the determination that multiple contacts are to be attempted.

13. A method according to claim 12, wherein the contact information comprises an indicator of whether multiple contacts are to be attempted in establishing the call.

14. A method according to claim 9, further comprising:

determining from the contact information whether multiple contacts provided in the contact information are redundant contacts referring to a common terminating point, wherein the suppression of the session progress indication is based on the determination that the multiple contacts are redundant contacts.

15. A method according to claim 14, wherein the contact information comprises an indicator of whether multiple contacts are redundant contacts.

16. A method according to claim 9, further comprising:

determining from the contact information whether early media is to be suppressed during the establishment of the call; and selectively suppressing the session progress indication responsive to whether early media is to be suppressed.

17. A method according to claim 16, wherein the contact information comprises an indicator of whether early media is to be suppressed.

18. A method according to claim 9, further comprising:

determining from the contact information whether a contact will provide session progress indication; and selectively suppressing the session progress indication when received from the contact.

19. A method according to claim 18, wherein the contact information indicates whether the contact corresponds to a gateway.

20. A method for managing a call within a communications system, the method comprising:

receiving a request from a first entity for a call to be established with a second entity;

determining whether suppression of early media is needed for the call;

dispatching a message related to establishing the call;

receiving a response to the message comprising early media provisions;

modifying the response to remove the early media provisions; and sending the modified response to the first entity.

21. A method according to claim 20, further comprising:

obtaining, from a location server, contact information pertaining to the requested call; and determining whether suppression needed responsive to the content of the contact information from the location server.

22. A network server for supporting call establishment in a communications system, the network server comprising:

means for receiving a session progress indication;

means for determining a call to which the session progress indication pertains;

means for determining whether the session progress indication is to be suppressed during establishment of the call; and means for suppressing the session progress indication responsive to whether the session progress indication is to be suppressed.

23. A method of supporting telephony services over a data communication network, the method comprising:

receiving a plurality of media streams associated with a communication session between an originating network element and a plurality of terminating network elements, each of the media streams being received from a respective one of the terminating network elements and specifying a communication parameter of the communication session;

converting the media streams to a single signaling stream; and forwarding the signaling stream to the originating network element.

24. A method according to claim 23, wherein one of the media streams includes an indicator of status of the communication session, the method further comprising:

modifying the indicator of the one media stream to represent a different status; and outputting the modified media stream as the signaling stream.

25. A method according to claim 24, wherein the indicator specifies one of a ringing indication, and a ringback indication.

26. A method according to claim 23, wherein the media streams are received according to a Session Initiation Protocol (SIP).

27. A method according to claim 25, wherein the originating network element includes one of a user station and a gateway configured to support the communication session.

28. A method according to claim 23, further comprising:

obtaining contact information pertaining to the communication session, wherein the converting step is performed based on the contact information.

29. A method according to claim 28, further comprising:

determining from the contact information whether the communication session involves a feature invocation.

30. A method according to claim 28, further comprising:

determining from the contact information whether the terminating network elements are redundant contacts.

31. A computer-readable medium carrying one or more sequences of one or more instructions for supporting telephony services over a data communication network, the one or more sequences of one or more instructions including instructions which, when executed by one or more processors, cause the one or more processors to perform the steps of:

receiving a plurality of media streams associated with a communication session between an originating network element and a plurality of terminating network elements, each of the media streams being received from a respective one of the terminating network elements and specifying a communication parameter of the communication session;

converting the media streams to a single signaling stream; and forwarding the signaling stream to the originating network element.

32. A computer-readable medium according to claim 31, wherein one of the media streams includes an indicator of status of the communication session, the one or more processors further performing the steps of:

modifying the indicator of the one media stream to represent a different status; and outputting the modified media stream as the signaling stream.

33. A computer-readable medium according to claim 32, wherein the indicator specifies one of a ringing indication, and a ringback indication.

34. A computer-readable medium according to claim 31, wherein the media streams are received according to a Session Initiation Protocol (SIP).

35. A computer-readable medium according to claim 33, wherein the originating network element includes one of a user station and a gateway configured to support the communication session.

36. A computer-readable medium according to claim 31, wherein the one or more processors further perform the step of:

obtaining contact information pertaining to the communication session, wherein the converting step is preformed based on the contact information.

37. A computer-readable medium according to claim 36, wherein the one or more processors further perform the step of:

determining from the contact information whether the communication session involves a feature invocation.

38. A computer-readable medium according to claim 36, wherein the one or more processors further perform the step of:

determining from the contact information whether the terminating network elements are redundant contacts.

39. An apparatus of supporting telephony services over a data communication network, the apparatus comprising:

a communication interface configured to receive a plurality of media streams associated with a communication session between an originating network element and a plurality of terminating network elements, each of the media streams being received from a respective one of the terminating network elements and specifying a communication parameter of the communication session; and a processor coupled to the communication interface, and configured to convert the media streams to a single signaling stream, wherein the signaling stream is forwarded to the originating network element.

40. An apparatus according to claim 39, wherein one of the media streams includes an indicator of status of the communication session, the processor is further configured to modify the indicator of the one media stream to represent a different status, and to output the modified media stream as the signaling stream.

41. An apparatus according to claim 40, wherein the indicator specifies one of a ringing indication, and a ringback indication.

42. An apparatus according to claim 39, wherein the media streams are received according to a Session Initiation Protocol (SIP).

43. An apparatus according to claim 41, wherein the originating network element includes one of a user station and a gateway configured to support the communication session.

44. An apparatus according to claim 39, wherein the processor is further configured to retrieve contact information pertaining to the communication session from a location server, wherein the conversion is performed based on the contact information.

45. An apparatus according to claim 44, wherein the processor is further configured to determine from the contact information whether the communication session involves a feature invocation.

46. An apparatus according to claim 44, wherein the processor is further configured to determine from the contact information whether the terminating network elements are redundant contacts.

* * * * *